United States Patent
Nammoto et al.

(10) Patent No.: US 9,925,668 B2
(45) Date of Patent: Mar. 27, 2018

(54) ROBOT, CONTROL UNIT, AND CONTROL METHOD

(71) Applicants: Seiko Epson Corporation, Tokyo (JP); Tohoku University, Sendai-shi, Miyagi-ken (JP)

(72) Inventors: Takashi Nammoto, Azumino (JP); Kazuhiro Kosuge, Sedai (JP); Abhilasha Saksena, Bangalore (IN)

(73) Assignees: Seiko Epson Corporation (JP); Tohoku University (JP)

( * ) Notice: Subject to any disclaimer, the term of this patent is extended or adjusted under 35 U.S.C. 154(b) by 19 days.

(21) Appl. No.: 15/092,749

(22) Filed: Apr. 7, 2016

(65) Prior Publication Data

US 2016/0297071 A1 Oct. 13, 2016

(30) Foreign Application Priority Data

Apr. 10, 2015 (JP) ................. 2015-080904

(51) Int. Cl.
*B25J 9/16* (2006.01)

(52) U.S. Cl.
CPC .......... *B25J 9/1664* (2013.01); *B25J 9/1651* (2013.01); *B25J 9/1666* (2013.01); *G05B 2219/39082* (2013.01); *G05B 2219/39084* (2013.01); *G05B 2219/40583* (2013.01)

(58) Field of Classification Search
CPC ...... B25J 9/1664; B25J 9/1651; B25J 9/1666; B25J 9/1628; B25J 9/1669; B25J 9/1687; G05B 2219/39082; G05B 2219/39084; G05B 2219/40583; G05B 19/19; G05B 19/402; G05B 19/41; G05B 19/416; G05B 2219/39358; G05B 2219/39362; G05B 2219/40501; G05B 2219/40507; G05B 2219/40512; G05B 2219/40519
USPC ................... 700/250, 252, 255, 61, 62, 63; 318/568.17, 568.18

See application file for complete search history.

(56) References Cited

U.S. PATENT DOCUMENTS

| | | | | |
|---|---|---|---|---|
| 5,343,385 A | * | 8/1994 | Joskowicz | B25J 9/1664 700/255 |
| 7,734,358 B2 | * | 6/2010 | Watanabe | G05B 19/425 318/568.15 |
| 8,260,453 B2 | * | 9/2012 | Otsuki | G05B 19/404 318/568.15 |
| 8,977,395 B2 | * | 3/2015 | Negishi | B25J 9/1607 700/248 |
| 2011/0106308 A1 | * | 5/2011 | Eliasson | B25J 9/1664 700/250 |
| 2011/0153076 A1 | * | 6/2011 | Noro | B25J 9/1687 700/245 |

(Continued)

FOREIGN PATENT DOCUMENTS

| | | |
|---|---|---|
| JP | 2002-355724 A | 12/2002 |
| JP | 2006-350620 A | 12/2006 |

(Continued)

*Primary Examiner* — Bao Long T Nguyen
(74) *Attorney, Agent, or Firm* — Harness, Dickey & Pierce, P.L.C.

(57) ABSTRACT

A robot includes: an arm; and a controller that operates the arm, the controller generating a pathway according to a relative position and a relative orientation of: a first object that moves together with the arm; and a second object and according to a first position of the first object.

10 Claims, 18 Drawing Sheets

(56) References Cited

U.S. PATENT DOCUMENTS

| | | | |
|---|---|---|---|
| 2012/0095599 A1* | 4/2012 | Pak | B25J 9/1664 700/275 |
| 2013/0184870 A1* | 7/2013 | Ota | B25J 9/1669 700/262 |
| 2016/0089788 A1* | 3/2016 | Nammoto | B25J 9/1633 700/250 |
| 2016/0176015 A1* | 6/2016 | Naderer | B24B 49/006 451/5 |

FOREIGN PATENT DOCUMENTS

| | | |
|---|---|---|
| JP | 2008-226117 A | 9/2008 |
| JP | 2010-137298 A | 6/2010 |

* cited by examiner

ROBOT, CONTROL UNIT, AND CONTROL METHOD

CROSS-REFERENCE TO RELATED APPLICATION

This application claims priority from Japanese Patent Application No. 2015-080904 filed on Apr. 10, 2015, the contents of which are incorporated herein by reference.

BACKGROUND

1. Technical Field

The present invention relates to a robot, a control unit, and a control method.

2. Related Art

A robot technology of assembling objects to each other has been researched or developed.

Regarding this technology, an automatic assembling system is known which sequentially assembles and attaches a plurality of components to each other by use of an assembling mechanism including a component gripping means and which thereby forms a predetermined assembled object (refer to Japanese Unexamined Patent Application, First Publication No. 2006-350620).

However, such automatic assembling system cannot change the moving speed of the component depending on the relative position and the relative orientation of the components, it is difficult to reduce the time needed to assemble the components.

As a result, there is a case where the amount of time required for the operation including assembling components to be incorporated into a body becomes longer.

SUMMARY

A first aspect of the invention provides a robot including an arm and a controller that operates the arm. The controller generates the pathway according to the relative position and the relative orientation of: a first object that moves together with the arm; and a second object, and according to a first position of the first object.

With this configuration, the robot generates the pathway according to the relative position and the relative orientation of: the first object that moves together with the arm; and the second object, and according to a first position of the first object.

Consequently, the robot can transfer the first object along the pathway according to the relative position and the relative orientation of the first object and the second object and according to the first position of the first object.

As a result, for example, the robot can prevent the first object or the robot from interfering with the other object and reduce the time needed to transfer the first object.

In the robot according to the first aspect, it is preferable that the controller generate the pathway by use of a first object movable range according to the relative position and the relative orientation.

With this configuration, the robot generates the pathway by use of the first object movable range according to the relative position and the relative orientation of the first object and the second object.

Accordingly, the robot can transfer the first object along the pathway which is generated by use of the first object movable range.

In the robot according to the first aspect, it is preferable that, according to the object movable range, the controller calculate the value which represents the degree of difficulty in movement of the first object or the degree of ease of movement thereof depending on the relative position and the relative orientation, and that the controller generate the pathway by use of the value which represents the calculated degree.

With this configuration, according to the first object movable range, the robot calculates the value which represents the degree of difficulty in movement of the first object or the degree of ease of movement thereof depending on the relative position and the relative orientation of the first object and the second object, and that the robot generate the pathway by use of the value which represents the calculated degree.

For this reason, the robot can transfer the first object along the pathway generated by use of the value which represents the degree of difficulty in movement of the first object or the degree of ease of movement thereof.

In the robot according to the first aspect, it is preferable that the controller generate the pathway by use of the first position and a second position of the first object.

With this configuration, the robot generates the pathway by use of the first position of the first object and the second position of the first object.

Because of this, the robot can transfer the first object along the pathway generated by use of the first position of the first object and the second position of the first object.

In the robot according to the first aspect, it is preferable that the controller further generate the pathway by use of a first orientation corresponding to the first position and a second orientation corresponding to the second position.

With this configuration, the robot further generates the pathway by use of the first orientation corresponding to the first position of the first object and the second orientation of the first object corresponding to the second position.

Therefore, the robot can transfer the first object along the pathway generated by use of the first orientation corresponding to the first position of the first object and the second orientation corresponding to the second position of the first object.

In the robot according to the first aspect, it is preferable that, according to the relative position, the relative orientation, and a predetermined position, the controller determine the moving speed of the arm.

With this configuration, according to the relative position and the relative orientation of the first object and the second object and the first position of the first object, the robot determines the moving speed of the arm.

Consequently, the robot can transfer the first object at the speed which is determined according to the first position of the first object and the relative position and the relative orientation of the first object and the second object.

In the robot according to the first aspect, it is preferable that the controller determine the speed by use of the first object movable range according to the relative position and the relative orientation.

With this configuration, the robot uses the first object movable range according to the relative position and the relative orientation of the first object and the second object to determine the moving speed of the arm by the robot.

As a result, the robot can transfer the first object at the speed determined by use of the first object movable range.

In the robot according to the first aspect, it is preferable that the controller calculate the value which represents the degree of difficulty in movement of the first object or the degree of ease of movement thereof depending on the relative position and the relative orientation, and that the controller determine the speed by use of the value which represents the calculated degree.

With this configuration, the robot calculates the value which represents the degree of difficulty in movement of the first object or the degree of ease of movement thereof depending on the relative position and the relative orientation of the first object and the second object, the robot uses the value which represents the calculated degree, and the robot determines the moving speed of the arm.

Consequently, the robot can transfer the first object at the speed determined by use of the value which represents the degree of difficulty in movement of the first object or the degree of ease of movement thereof.

In the robot according to the first aspect, it is preferable that the controller determine the speed by use of a third position of the first object and a fourth position of the first object.

With this configuration, the robot determines the moving speed of the arm by use of the third position of the first object and the fourth position of the first object.

Accordingly, the robot can transfer the first object at the speed determined by use of the third position of the first object and the fourth position of the first object.

In the robot according to the first aspect, it is preferable that the controller further determine the speed by use of the third orientation corresponding to the third position and the fourth orientation corresponding to the fourth position.

With this configuration, the robot determines the moving speed of the arm by use of the third orientation corresponding to the third position of the first object and the fourth orientation corresponding to the fourth position of the first object.

Because of this, the robot can transfer the first object at the speed determined by use of the third orientation corresponding to the third position of the first object and the fourth orientation corresponding to the fourth position of the first object.

A second aspect of the invention provides a control unit that generates the pathway according to the relative position and the relative orientation of: a first object that moves together with an arm provided by robot; and a second object, and according to a first position of the first object.

With this configuration, the control unit generates the pathway according to the relative position and the relative orientation of: the first object that moves together with the arm provided in the robot; and the second object, and according to the first position of the first object.

For this reason, the control unit can transfer the first object along the pathway according to the relative position and the relative orientation of the first object and the second object and according to the first position of the first object.

As a result, for example, the control unit can prevent the first object or the robot from interfering with the other object and reduce the time needed to transfer the first object.

A third aspect of the invention provides a control method including: generating the pathway according to the relative position and the relative orientation of: a first object that moves together with an arm provided by robot; and a second object, and according to a first position of the first object.

With this configuration, the control method generates the pathway according to the relative position and the relative orientation of: the first object that moves together with the arm provided in the robot; and the second object, and according to the first position of the first object.

Therefore, the control method can transfer the first object along the pathway according to the relative position and the relative orientation of the first object and the second object and according to the first position of the first object.

As a result, for example, the control method can prevent the first object or the robot from interfering with the other object and reduce the time needed to transfer the first object.

As described above, the robot, the control unit, and the control method generate the pathway according to the relative position and the relative orientation of: the first object that moves together with the arm provided in the robot; and the second object, and according to the first position of the first object.

Because of this, the robot, the control unit, and the control method can transfer the first object along the pathway according to the relative position and the relative orientation of the first object and the second object and according to the first position of the first object.

As a result, for example, the robot, the control unit, and the control method can prevent the first object or the robot from interfering with the other object and reduce the time needed to transfer the first object.

BRIEF DESCRIPTION OF THE DRAWINGS

The invention will be described with reference to the accompanying drawings, wherein like numbers reference like elements.

DESCRIPTION OF EXEMPLARY
EMBODIMENTS

First Embodiment

Hereinafter, a first embodiment of the invention will be described with reference to drawings.

Figure 1:
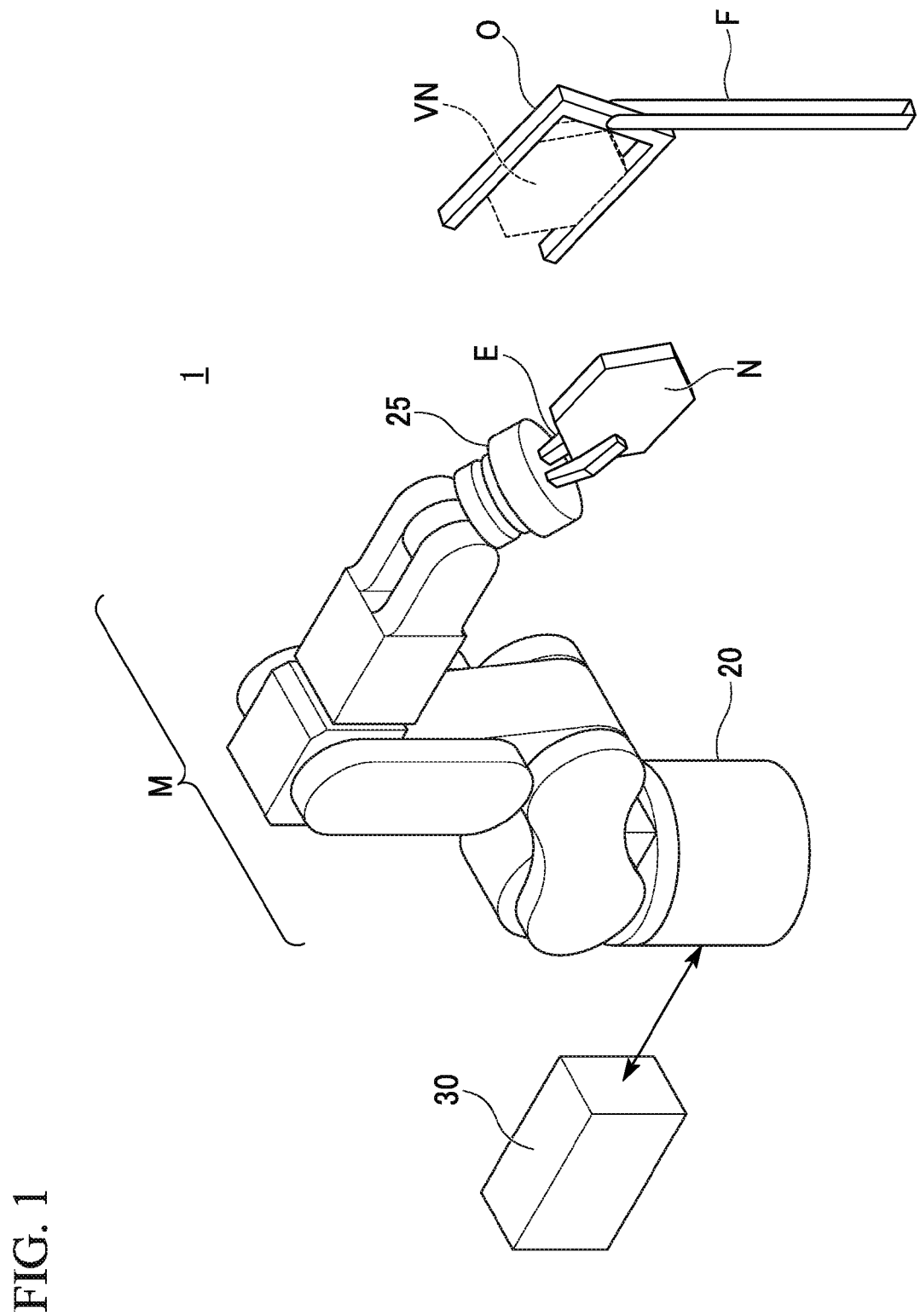
FIG. 1 is a block diagram showing an example of a robotic system 1 according to the first embodiment.

FIG. 1 is a block diagram showing an example of a robotic system 1 according to the first embodiment.

The robotic system 1 includes a robot 20 and a control unit 30.

In other cases, the robotic system 1 may be configured to include an imaging unit different from the robot 20.

Firstly, the configurations of the robot 20 and the control unit 30 will be described.

The robot 20 is a single arm robot including an arm, a force sensor 25, and the control unit 30.

The single arm robot is a robot provided with a single arm according to this example.

In other cases, instead of the single arm robot, the robot 20 may be a two-arm robot.

The two-arm robot is a robot provided with two arms.

The robot 20 may be configured to include an imaging unit.

The arm is configured to include: an end effector E provided with a claw capable of holding an object; a manipulator M; and a plurality of actuators which are not shown in the figure.

The arm is a seven-axis vertical articulated arm.

Particularly, the arm carries out an operation with seven degrees of freedom and thereby realize the motion in which a support table, the end effector E, the manipulator M, and actuators are cooperated to each other.

The number of orientations in which the arm carries out an operation with seven degrees of freedom is greater than that of an operation with six degrees of freedom.

Consequently, for example, the arm smoothly operates, and it is easily possible to prevent the arm or an object from interfering with other objects that are present at the periphery of the arm.

The computational complexity in the control of the arm in an operation with seven degrees of freedom is lower than that in the control of an operation with eight degrees of freedom, it is possible to easily carry out the operation with seven degrees of freedom.

For these kinds of reasons, it is preferable for the arm to operate with seven degrees of freedom.

Accordingly, in the following example, a case where the arm operates with seven degrees of freedom will be described.

In other cases, the arm may operate with six degrees of freedom or less or may operate with eight degrees of freedom or more.

Each actuator is communicably connected to the control unit 30 via a cable.

Consequently, according to a control signal obtained from the control unit 30, the actuators can operate the end effector E and the manipulator M.

Wired communication via the cable is performed according to a standard such as an Ethernet (registered trademark) or a USB (Universal Serial Bus).

One or all of actuators may be configured to be connected to the control unit 30 by radio communication performed according to a communication standard such as Wi-Fi (registered trademark).

The force sensor 25 is provided between the end effector E and the manipulator M.

The force sensor 25 detects a value indicating the amount of force or moment which acts on the end effector E.

The force sensor 25 may be another sensor such as a torque sensor that detects a value indicating the amount of force or moment which is applied to the end effector E.

The force sensor 25 outputs force sensor information to the control unit 30 by communication.

The force sensor information includes the value indicating the amount of force or moment which is detected by the force sensor 25 as the output value from the force sensor 25.

The force sensor information is used in control according to the force sensor information of the robot 20 which is carried out by the control unit 30.

The "control according to the force sensor information" means, for example, compliance control such as impedance control.

The force sensor 25 is communicably connected to the control unit 30 via a cable.

Wired communication via the cable is carried out according to a standard such as the Ethernet (registered trademark) or a USB.

In other cases, the force sensor 25 may be connected to the control unit 30 by radio communication performed according to a communication standard such as the Wi-Fi (registered trademark).

In this example, each of the functional units which are provided in the aforementioned robot 20 obtains a control signal from the control unit 30 built in the robot 20.

Furthermore, such functional units carry out operations according to the obtained control signal.

In other cases, instead of the configuration in which the control unit 30 controls the robot 20 and is provided outside the robot, the robot 20 may be configured to incorporate the control unit 30 thereinto.

The control unit 30 transmits a control signal to each of functional units provided in the robot 20 and thereby operates the robot 20.

The control unit 30 causes the robot 20 to carry out a predetermined operation.

In this example, as a predetermined operation, the control unit 30 causes the robot 20 to operate and thereby carry out an operation of incorporating a first object into a second object.

Hereinbelow, the first object and the second object, and a predetermined operation performed by the robot 20 will be described.

The first object is an operational object N which is gripped by the end effector E of the robot 20 as shown in, for example, FIG. 1.

In other cases, instead of the operational object N, the first object may be a predetermined portion the end effector E of the robot 20 or a predetermined portion of the manipulator M.

In this example, the operational object N is an object which is formed in a hexagonal pillar shape having a height such that the operational object can be gripped by the claw of the end effector E.

In other cases, instead of the above-described shape, the operational object N may be formed in other shapes and may have other sizes.

The second object is an object into which the first object is incorporated by the robot 20.

In other cases, instead of the above, as long as the second object is likely to interfere with the operational object N when the operational object N is transferred by the robot or the second object is provided at the position, such as some other jig, wall, or workbench, which does not vary with respect to the position and the orientation of the coordinate origin of the robot 20, any object may be adopted as the second object.

The second object is an assembly object O as shown in, for example, FIG. 1.

That is, the assembly object O is an object into which the operational object N is incorporated by the robot 20.

As shown in FIG. 1, in this example, the assembly object O is supported by a jig F.

In other cases, instead of the above, the assembly object O may be provided on a place such as a table, some other base, or the like.

In this case, the position and the orientation of the assembly object O are determined so as not to vary with respect to the position and the orientation of the coordinate origin of the robot 20.

The position and the orientation of the coordinate origin of the robot 20 are, for example, the position and the orientation of the center of gravity of the support table of the robot 20.

In other cases, instead of the above, the position and the orientation of the coordinate origin of the robot 20 may be the position and the orientation which are associated with that of the robot 20.

According to the relative position and the relative orientation of the operational object N and the assembly object O and according to a first position of the operational object N, the control unit 30 generates the pathway from the position at which the operational object N is started to be transferred by the robot in the workspace, to the position at which the operational object N is incorporated into the assembly object O.

Hereinafter, as an example, a case will be described where the first position of the operational object N is the position of the operational object N which is after the operational object N is incorporated into the assembly object O in a predetermined operation performed by the robot 20.

The relative position and the relative orientation of the operational object N and the assembly object O is an example of the relative position and the relative orientation of the first object and the second object.

When the control unit 30 generates the pathway, the control unit generates the pathway in which the operational object N is less likely to interfere with the assembly object O or the other object and the pathway can quickly transfers the operational object N therethrough.

Consequently, the control unit 30 can transfer the operational object N along the pathway that is generated in accordance with the relative position and the relative orientation of the operational object N and the assembly object O and in accordance with the position of the operational object N which is after the operational object N is incorporated into the assembly object O.

As a result, the control unit 30 can prevent the first object or the robot from interfering with the other object and reduce the time needed to transfer the first object.

In other cases, the first position of the operational object N may be the other position of the operational object N in the workspace.

Hereinbelow, for convenience of explanation, the position of the operational object N which is after the operational object N is incorporated into the assembly object O in a predetermined operation performed by the robot 20 is referred to as an assembling position. The orientation of the operational object N corresponding to the assembling position is referred to as an assembling orientation.

Hereinafter, a case will be described where the position and the orientation of the operational object N are the position and the orientation of the center of gravity of the operational object N.

In other cases, instead of the above position and the above orientation, the position and the orientation of the operational object N may be the position and the orientation of the other point which move together with the operational object N.

Hereinafter, a case will be described where the position and the orientation of the assembly object O are the position and the orientation of the center of gravity of the assembly object O.

In other cases, instead of the above position and the above orientation, the position and the orientation of the assembly object O may be the position and the orientation of the other point to which the assembly object O is integrally fixed.

The workspace according to this example means part of the region or the entirety of the region of the flat surface or the space including the pathway that allows the robot 20 to transfer the center of gravity of the operational object N in order to incorporate the operational object N into the assembly object O.

The assembly object O is included in the workspace.

Figure 2:
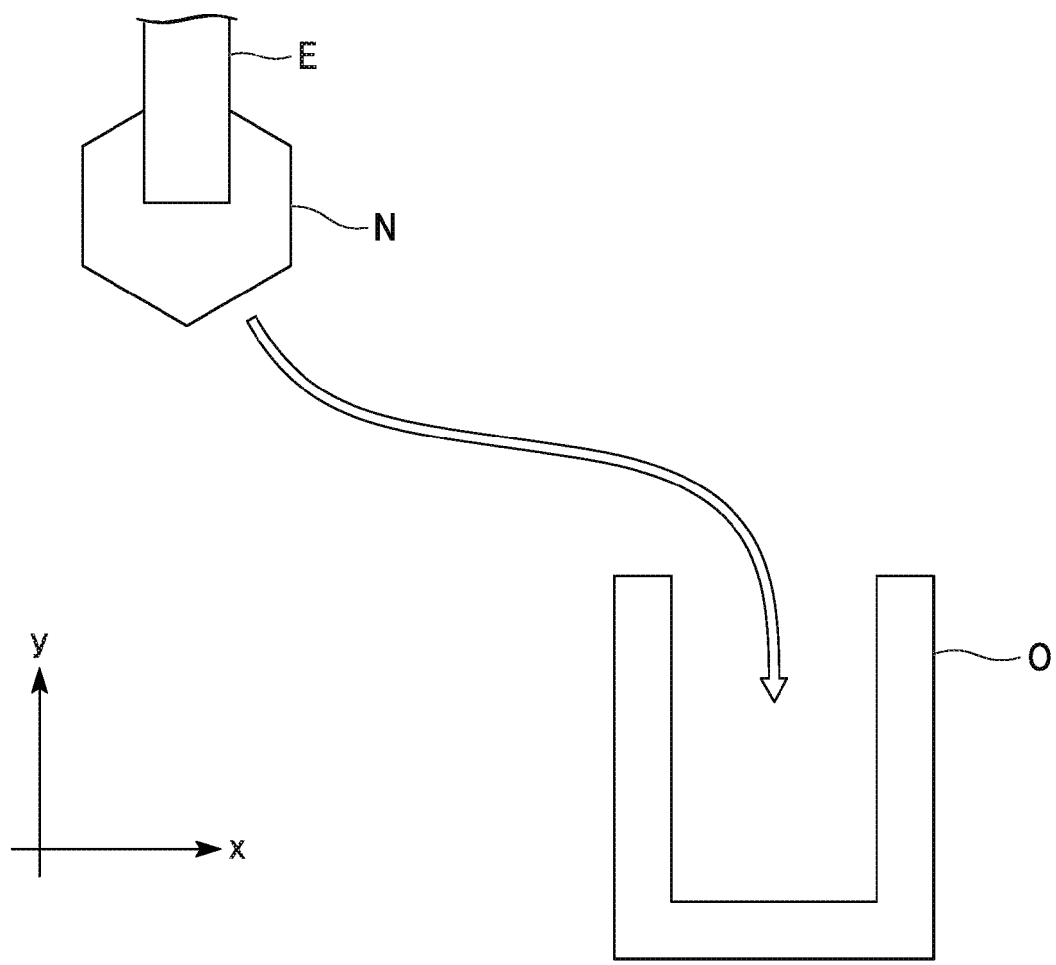
FIG. 2 is a view showing an example of a state where the robot 20 incorporates an assembly object O into an operational object N along a workspace according to the embodiment.

Hereinbelow, for ease in explanation, a case will be described where, for example, the workspace is a two-dimensional (xy) flat surface as shown in FIG. 2.

FIG. 2 is a view showing an example of a state where the robot 20 incorporates an assembly object O into an operational object N along a workspace according to the embodiment.

The X-axis and the Y-axis shown in FIG. 2 are the coordinate axes on the two-dimensional flat surface including the assembly object O (i.e., workspace).

The robot 20 incorporates the operational object N gripped by, for example, the end effector E, into the assembly object O along the arrow in FIG. 2 (the aforementioned pathway).

In the embodiment, the robot 20 only transfer the operational object N along the two-dimensional flat surface indicated by the coordinate axes shown in FIG. 2 in this assembling operation.

In other cases, the robot 20 may be configured to transfer the operational object N along the pathways that spread in the three-dimensional (xyz) space in addition to the configuration which transfers the operational object N along the workspace which is the two-dimensional flat surface.

According to the relative position and the relative orientation of the operational object N and the assembly object O and according to the assembling position of the operational object N, the control unit 30 determines the speed at which the robot 20 transfers the operational object N at each position on the pathway generated by the control unit 30.

Subsequently, the control unit 30 operates the robot 20 in accordance with the generated pathway and the determined speed, and the operational object N is thereby incorporated into the assembly object O.

As a result of incorporating the operational object N into the assembly object O as described above, the robot 20 prevents the operational object N or the robot from interfering with the assembly object O or the other object and reduces the time needed to transfer the operational object N.

Particularly, the dotted line VN shown in FIG. 1 indicates the outline of the operational object N in a state of being incorporated into the assembly object O.

Particularly, the control unit 30 operates the robot 20 by compliance control and causes the robot 20 to incorporate the operational object N into the assembly object O.

Therefore, even in the case where the operational object N interferes with the assembly object O or the other object, the control unit 30 can cause the robot 20 to incorporate the operational object N into the assembly object O without deformation of, for example, the operational object N, the assembly object O, or the another object.

Next, the hardware configuration of the control unit 30 will be described with reference to FIG. 3.

Figure 3:
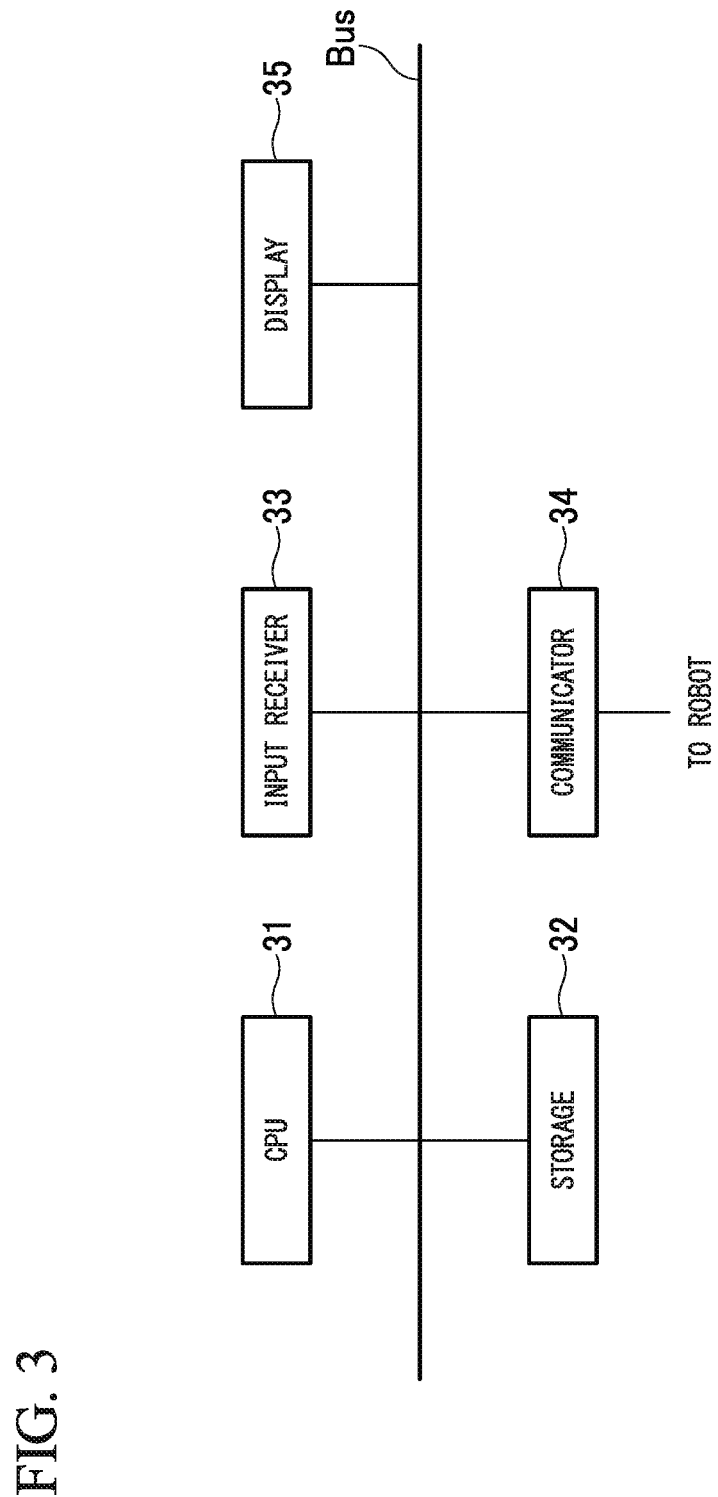
FIG. 3 is a diagram showing an example of the hardware configuration of the control unit 30.

FIG. 3 is a diagram showing an example of the hardware configuration of the control unit 30.

The control unit 30 includes, for example, a CPU 31 (Central Processing Unit), a storage 32, an input receiver 33, a communicator 34, and a display 35.

The control unit 30 carries out communication with the robot 20 via the communicator 34.

These components are communicably connected to each other via a bus Bus.

The CPU 31 executes various computer programs stored in the storage 32.

The storage 32 includes, for example, a HDD (Hard Disk Drive), an SSD (Solid State Drive), an EEPROM (Electrically Erasable Programmable Read-Only Memory), a ROM (Read-Only Memory), a RAM (Random Access Memory), or the like.

The storage 32 stores various kinds of information, images, and computer programs to be processed by the control unit 30, information representing the position and the orientation of the assembly object O, information representing a workspace when a predetermined operation is carried out, or the like.

In other cases, the storage 32 may be an external storage device connected by, for example, a digital input-output port of the USB or the like instead of a storage incorporated in the control unit 30.

The input receiver 33 is, for example, a keyboard, a mouse, a teaching pendant provided with a touch pad or the like, or other input device.

In other cases, the input receiver 33 may be configured integrally with the display 35 serving as a touch panel.

The communicator 34 is configured to include, for example, a digital input-output port such as a USB or an Ethernet (registered trademark) port.

The display 35 is, for example, a liquid crystal display panel or an organic EL (Electro Luminescence) display panel.

Next, the functional configuration of the control unit 30 will be described with reference to FIG. 4.

Figure 4:
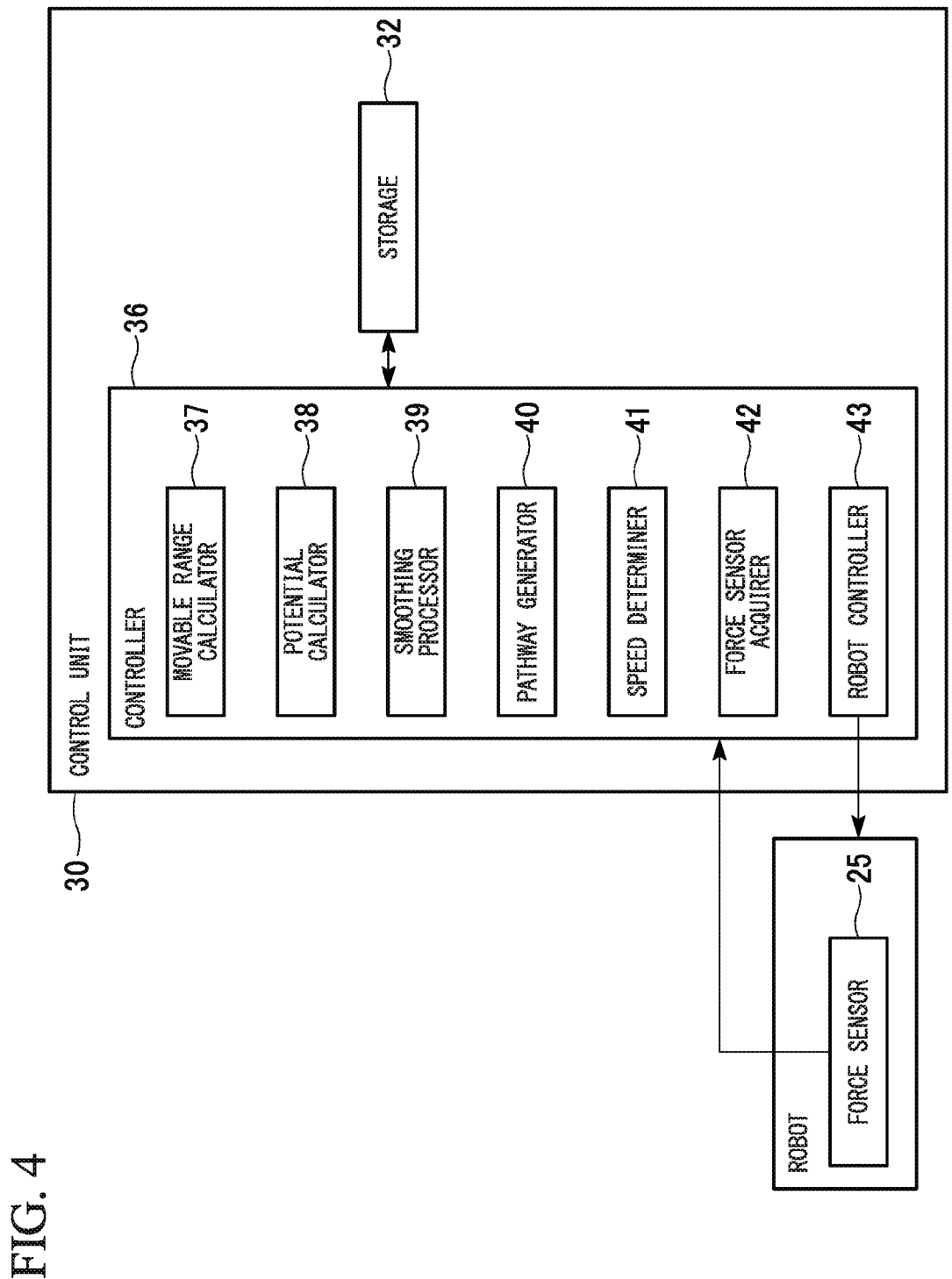
FIG. 4 is a diagram showing an example of the functional configuration of the control unit 30.

FIG. 4 is a diagram showing an example of the functional configuration of the control unit 30.

The control unit 30 includes the storage 32 and a controller 36.

The controller 36 controls the entirety of the control unit 30.

The controller 36 includes a movable range calculator 37, a potential calculator 38, a smoothing processor 39, a pathway generator 40, a speed determiner 41, a force sensor acquirer 42, and a the robot controller 43.

As the CPU 31 executes, for example, various computer programs stored in the storage 32, part of or the entirety of the functional units which are provided in the controller 36 are realized.

A part or all of the functional units may be hardware functional units such as an LSI (Large Scale Integration) and an ASIC (Application Specific Integrated Circuit).

The movable range calculator 37 calculates a movable range.

The movable range is the value which is determined at each point in the workspace.

The movable range is the value quantitatively indicating the range in which the operational object N can move in the workspace without coming into contact with the assembly object O or other object.

The potential calculator 38 calculates a movable potential according to the movable range calculated by the movable range calculator 37.

The movable potential is the value which is determined at each point in the workspace.

The movable potential is the value which represents the degree of difficulty in movement of the operational object N (or the degree of ease of movement of the operational object N) at each point in the workspace.

Since the movable potential is calculated at each point in the workspace, the movable potential is represented as a function associated with the coordinates of each point in the workspace.

The movable potential is referred to as a potential; however, the movable potential is not a physical quantity.

The reason why the movable potential is referred to as a potential, is because the value of the rigidity of the operational object N at each of the points of the workspace (i.e., the value which represents the degree of difficulty in movement of the operational object N gripped by the end effector E (or the degree of ease of movement of the operational object N)) is analogized from potential energy associated with a conservative force that acts on the object at each of the points in the space.

In this case, the state where it is difficult for the operational object N to be moved means the state where the operational object N is very likely to interfere with the assembly object O or the other object due to movement of the operational object N.

Here, since the position and the orientation of the assembly object O in the workspace do not vary, the position and the orientation of the operational object N in the workspace represent the relative position and the relative orientation of the operational object N and the assembly object O.

This means that, according to the relative position and the relative orientation of the operational object N and the assembly object O, the potential calculator 38 calculates, as the movable potential of each of the points in the workspace, the value which represents the degree of difficulty in movement of the operational object N.

The potential calculator 38 calculates the distance potential according to the assembling position of the operational object N in the workspace.

The distance potential is the value which is determined at each point in the workspace.

The distance potential is the value which represents the speed at which the robot 20 can transfer the operational object N at each point in the workspace.

For example, the speed can be high at the place at which the distance potential is low, and the speed at the place at which the distance potential is high is required to be slower than that of the place at which the distance potential is low.

Since the distance potential is calculated at each point in the workspace, the distance potential is represented as a function associated with the coordinates (i.e., position) of each point in the workspace.

The distance potential is referred to as a potential; however, the movable potential is not a physical quantity.

The reason why the distance potential is referred to as a potential, is because the value which represents the speed at which the operational object N can be transferred by the end effector E at each of the points of the workspace is analogized from potential energy associated with a conservative force that causes the object to accelerate at each of the points in the space.

The potential calculator 38 calculates the pathway potential which is obtained by combining the calculated movable potential and the distance potential.

The pathway potential is the value which represents the reference of the position at which the robot 20 easily moves the operational object N and can cause the operational object N to quickly transfer the operational object N when the robot 20 incorporates the operational object N into the assembly object O.

Since the pathway potential is a function associated with the coordinates (position) at which the movable potential and the distance potential represent each of the points in the workspace, the pathway potential is represented as a function associated with the coordinates (position) that indicates each of the points in the workspace.

The smoothing processor 39 passes, through a low-pass filter, the function which represents the pathway potential and is calculated by the potential calculator 38.

Consequently, the smoothing processor 39 smooths (i.e., average) the function representing the pathway potential.

Hereinbelow, for convenience of explanation, the conversion (filtering) of the function representing the pathway potential which is carried out by the smoothing processor 39 in the above-described manner is referred to as that the potential having a smooth distribution is generated.

Hereinafter, the function representing the pathway potential which is before passed through the low-pass filter is referred to as a discontinuously-variable pathway potential.

In the case where the robot 20 is controlled in accordance with the discontinuously-variable pathway potential, a workload is applied to, for example, actuators, and it may thereby results in failure of the robot.

For this reason, the smoothing processor 39 passes the calculated discontinuously-variable pathway potential through the low-pass filter and thereby generates potential having a smooth distribution.

According to the pathway potential smoothed by the smoothing processor 39, the pathway generator 40 generates a pathway from the position at which the operational object N is started to be transferred by the robot, to the position at which the robot 20 incorporates the operational object N into the assembly object O.

The pathway generated by the pathway generator 40 is the pathway in which the operational object N is less likely to interfere with the assembly object O or the other object and the pathway can promptly transfers the operational object N therethrough.

According to the pathway potential smoothed by the smoothing processor 39, at each of the points on the pathway generated by the pathway generator 40, the speed determiner 41 determines the speed at which the robot 20 transfers the operational object N.

The force sensor acquirer 42 obtains the force sensor information detected by the force sensor 25.

The robot controller 43 operates the robot 20 according to the pathway generated by the pathway generator 40 and the speed at which the robot 20 transfers the operational object N at each of the points on the pathway determined by the speed determiner 41, and the robot incorporates the operational object N into the assembly object O.

At this time, the robot controller 43 operates the robot 20 by compliance control according to the force sensor information obtained by the force sensor acquirer 42.

Hereinbelow, with reference to FIG. 5, the process will be described in which the control unit 30 calculates the pathway potential and a predetermined operation is carried out.

Figure 5:
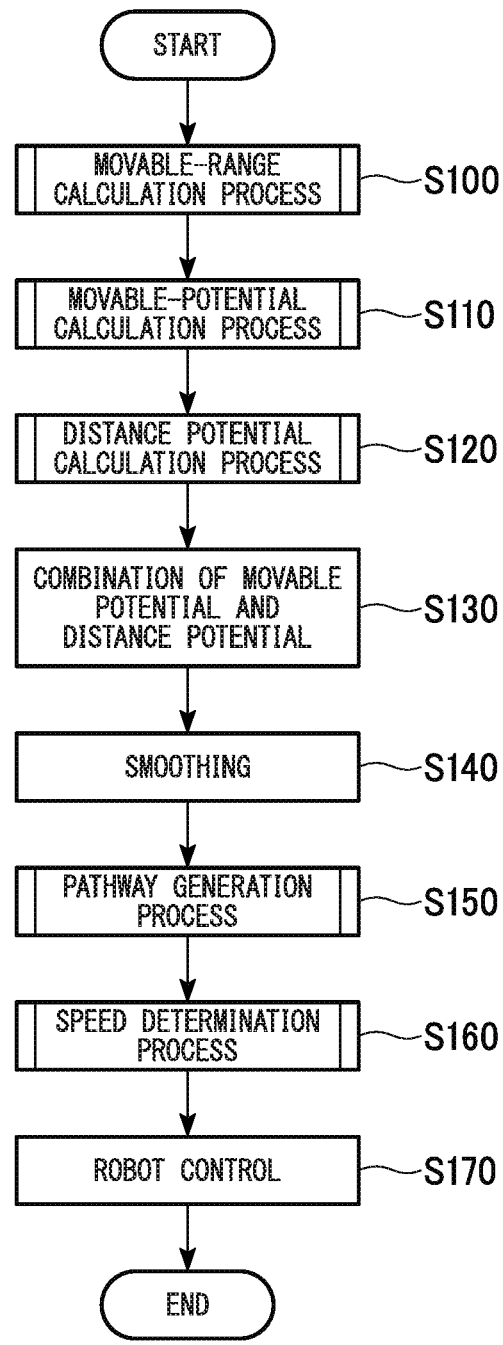
FIG. 5 is a flowchart showing an example of the flow of processing in which the control unit 30 calculates the pathway potential of the operational object N and carries out a predetermined operation.

FIG. 5 is a flowchart showing an example of the flow of processing in which the control unit 30 calculates the pathway potential of the operational object N and carries out a predetermined operation.

Hereinafter, for example, a case will be described where the robot 20 grips the operational object N by the end effector E in advance.

Accordingly, the control unit 30 may be configured to cause the robot 20 to grip the operational object N and thereafter causes the robot 20 to carry out a predetermined operation.

Firstly, the movable range calculator 37 carries out a movable-range calculation process in which the movable range of the operational object N is calculated (step S100).

In this example, the movable range of the operational object N is the value which is determined at each of the points on the two-dimensional flat surface as described below. Particularly, the movable range of the operational object N is the value which is determined by the two values as follows:

(1) The sum of the distance (hereinbelow, referred to as the translational movable-range) in which the operational object N is movable in the X-direction and the Y-direction from the point on the two-dimensional flat surface that represents the workspace in the two-dimensional flat surface and the operational object N does not come into contact with the assembly object O; and (2) The sum of the rotational angle (hereinbelow, referred to as the rotational movable-range) in which the operational object N is rotatable in the positive direction (for example, counterclockwise) and in the negative direction (for example, clockwise) without coming into contact with the assembly object O at the above point.

Consequently, the movable-range calculation process includes two processes of the translational movable-range calculation process and the rotational movable-range calculation process.

The translational movable-range calculation process is the process that calculates the translational movable-range of the operational object N at each point in the workspace.

The rotational movable-range calculation process is the process that calculates the rotational movable-range of the operational object N at each point in the workspace.

The movable range calculator 37 may carry out any one of the translational movable-range calculation process and the rotational movable-range calculation process in advance in the movable-range calculation process or may simultaneously carry out both processes.

In other cases, the movable range calculator 37 may be configured to carry out only one of the translational movable-range calculation process and the rotational movable-range calculation process in the movable-range calculation process (i.e., the movable range of the operational object N is determined by any one of the translational movable-range and the rotational movable-range).

In other cases, the movable range of the operational object N may be determined by the other value associated with the operational object N at each point in the workspace.

Instead of the configuration of the movable range which is determined at each point in the workspace, the movable range of the operational object N may be configured to be determined at each region in the case where, for example, the workspace is divided into a plurality of regions.

Next, the potential calculator 38 carries out the movable-potential calculation process that calculates the movable potential of each of the points in the workspace according to any one of or both of the translational movable-range and the rotational movable-range of the operational object N calculated by the movable range calculator 37 in step S100 (step S110).

In the embodiment, a case will be described where the potential calculator 38 calculates the movable potential of each of the points in the workspace according to both the translational movable-range and the rotational movable-range of the operational object N in the movable-potential calculation process.

Subsequently, the potential calculator 38 carries out the distance potential calculation process that calculates the distance potential of each of the points in the workspace (step S120).

In other cases, the process of step S110 and the process of step S120 which are carried out by the potential calculator 38 may be carried out in the inverse order or may be carried out in parallel.

After that, the potential calculator 38 calculates the pathway potential which is obtained by combining the movable potential calculated in step S110 and the distance potential calculated in step S120 (step S130).

Next, the smoothing processor 39 passes the discontinuously-variable pathway potential which is calculated by the potential calculator 38 in step S130 through the low-pass filter and thereby generates (smoothing) the smoothly-variable pathway potential (step S140).

Subsequently, according to the pathway potential smoothed by the smoothing processor 39 in step S140, the pathway generator 40 carries out the pathway generation process that generates the pathway from the position at which the operational object N is started to be transferred by the robot, to the position at which the robot 20 incorporates the operational object N into the assembly object O (step S150).

Subsequently, according to the pathway potential smoothed by the smoothing processor 39 in step S140, the speed determiner 41 carries out the speed determination process that determines the speed at which the robot 20 transfers the operational object N at each of the points on the pathway generated by the pathway generator 40 in step S150 (step S160).

After that, according to the pathway generated by the pathway generator 40 in step S150 and according to the speed which is determined by the speed determiner 41 in step S160 and at which the robot 20 transfers the operational object N at each of the points on the pathway, the robot controller 43 causes the robot 20 to carry out a predetermined operation (step S170).

Particularly, according to the force sensor information obtained by the force sensor acquirer 42 in step S170, the robot controller 43 operates the robot 20 by compliance control.

Hereinbelow, the movable-range calculation process of step S100 shown in FIG. 5 will be described with reference to FIGS. 6 and 7.

Figure 6:
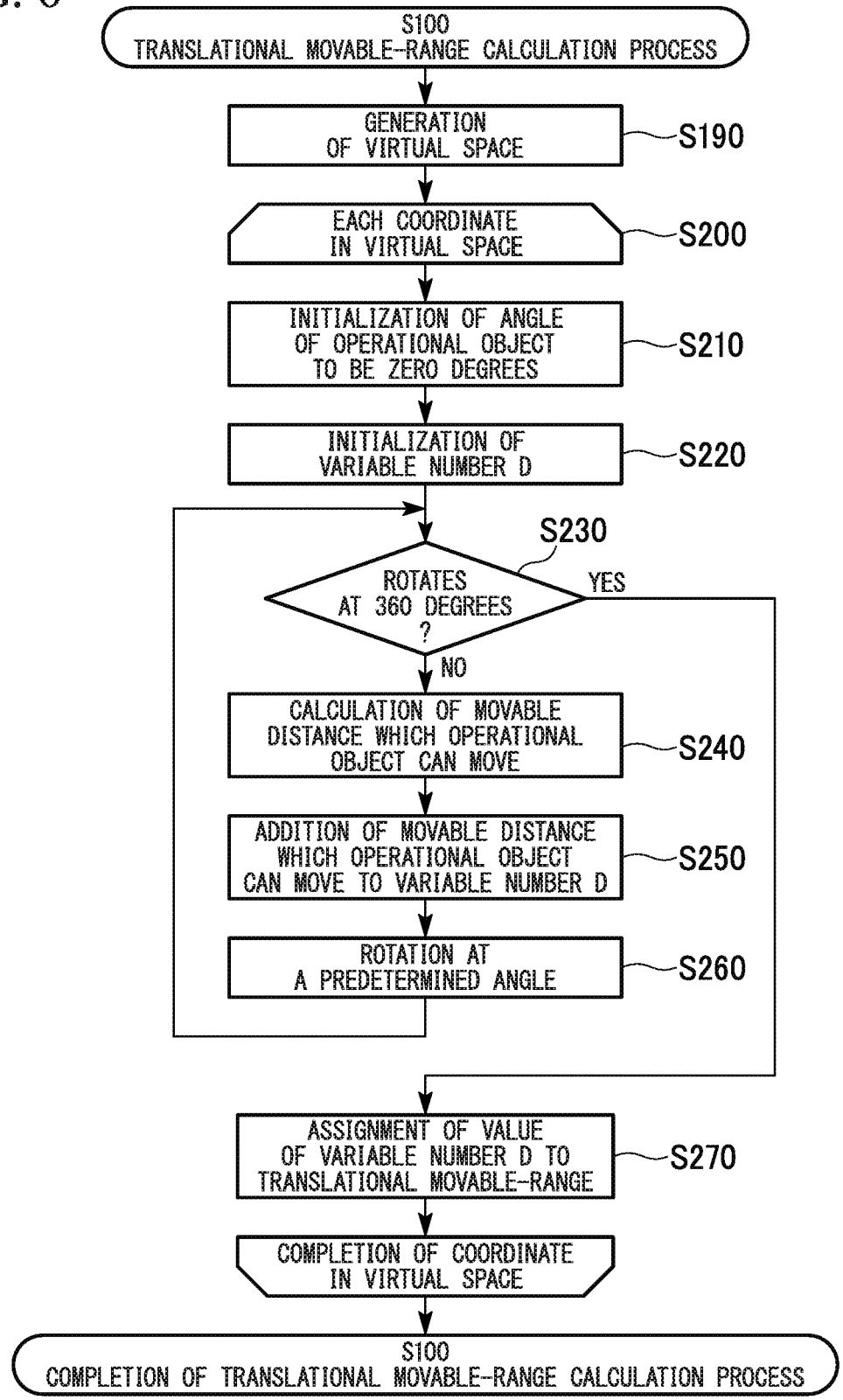
FIG. 6 is a flowchart showing an example of the flow of a translational movable-range calculation process in the movable-range calculation process of step S100 shown in FIG. 5.

FIG. 6 is a flowchart showing an example of the flow of a translational movable-range calculation process in the movable-range calculation process of step S100 shown in FIG. 5.

Firstly, the movable range calculator 37 reads in, from the storage 32, information associated with the size or the shape of the assembly object O, information associated with the position and the orientation of the assembly object O, and information associated with the workspace, and generates the virtual space that represents the workspace according to the read information associated with the position and the orientation of the assembly object O and the read information associated with the workspace (step S190).

In this example, a case will be described where information associated with the size or the shape of the assembly object O, information associated with the position and the orientation of the assembly object O, and information associated with the workspace is stored in the storage 32 in advance.

In other cases, instead of the above example, the robotic system 1 may be provided with an imaging unit that captures an image, and the information associated with the workspace may be detected according to the captured image by the imaging unit.

In this example, since the shape of the workspace is a rectangular flat surface shown in FIG. 2, the information associated with the workspace is defined by the combination of the coordinates of the corners.

Instead of the above-described information, the robotic system 1 may be provided with an imaging unit that captures an image, and the information associated with the position and the orientation of the assembly object O may be detected according to the captured image by the imaging unit.

In step S190, the assembly object O is ideally disposed in the virtual space generated by the movable range calculator 37.

The position and the orientation of the assembly object O in the virtual space in which the assembly object O is ideally disposed corresponds to the position and the orientation of the assembly object O in the actual workspace.

Next, the movable range calculator 37 selects the coordinates of each point of the virtual space generated in step S190 one by one.

The movable range calculator 37 repeatedly carries out the processes from step S210 to step S270 for each point (step S200).

After one point (coordinates) of the virtual space is selected by step S200, the movable range calculator 37 ideally disposes the operational object N at the point of the virtual space which is represented by the selected coordinates.

At this time, the movable range calculator 37 disposes the operational object N so as to coincide the center of gravity of the operational object N with the point of the virtual space.

The movable range calculator 37 initializes the orientation of the operational object N, which is disposed at the point of the virtual space, to be a predetermined orientation (step S210).

The predetermined orientation is the orientation such that, for example, the angle between the center line that passes through the preliminarily-determined position of the center of gravity of the operational object N and the X-axial direction or the Y-axial direction becomes zero degrees; however, the invention is not limited to this, other orientations may be adopted.

Subsequently, the movable range calculator 37 generates the variable number D in which information indicating a numerical value can be stored, and initializes the value of the variable number D to be zero (step S220).

After that, the movable range calculator 37 determines whether or not the cumulative value of the rotational angle regarding the rotation of the operational object N in step S260 reaches 360 degrees (step S230).

In the case where the cumulative value of the rotational angle regarding the rotation of the operational object N is determined not to reach 360 degrees (step S230—No), the movable range calculator 37 calculates the sum of the distances in the X-axis positive direction, the X-axis negative direction, the Y-axis positive direction, and the Y-axis negative direction (hereinbelow, referred to as four directions) in which the operational object N disposed at the point of the virtual space which is represented by the coordinates selected by step S200 is movable (step S240).

In other cases, regarding the sum of the distances which the operational object N can move and which are calculated by the movable range calculator 37 in the above-described manner, the following cases may be adopted instead of the sum of the distances which the operational object N can move in the four directions.
(1) The distance which the operational object N can move, in any one direction selected from the four directions may be adopted.
(2) The sum of the combination of some distances which the operational object N can move, in some directions selected from the four directions may be adopted.
(3) The sum of the distances which the operational object N can move, in one or more other directions (in the case where the number of the other directions is one, the sum thereof means the distance which the operational object N can move in said one direction).
(4) The sum of the distances which the operational object N can move, in the above-described four directions and other directions in which the operational object N can move.

For example, as the sum of the distances which the operational object N can move, the movable range calculator 37, in the case of calculating the sum of the distances which the operational object N can move in one or more other directions (e.g., in the direction (diagonal direction) or the like at the angle between the X-axis extending direction and the Y-axis extending direction), the distance in the aforementioned direction is calculated by a method of determining a distance in a metric space such as Pythagorean proposition.

Next, the movable range calculator 37 adds the sum of the distances which the operational object N can move in the four directions and which are calculated in step S240, to the value stored in the variable number D generated in step S220 (step S250).

Subsequently, the movable range calculator 37 rotates, by a predetermined angle, the orientation of the operational object N disposed at the point of the virtual space which is represented by the coordinates selected by step S200 (step S260).

In other cases, it is preferable that "a predetermined angle" be an arbitrary angle and that one of multiple numbers of the predetermined angle be 360 degrees, for this example, 5 degrees, 10 degrees, or the like is preferable; however, another angle of which one of the multiple numbers is not 360 degrees may be adopted.

In other words, in the case of collectively describing the processes from step S230 to step S260, the movable range calculator 37 varies, by a predetermined angle in increments, the orientation of the operational object N disposed at the point of the virtual space which is represented by the coordinates selected by step S200; the movable range calculator 37 calculates the sum of the distances which the operational object N can move in the aforementioned four directions for each of the orientations of the operational object N; and the movable range calculator 37 adds the calculated sum of the distances which the operational object N can move in the four directions for each of the orientations to the variable number D.

Here, the processes from step S230 to step S260 will be described with reference to FIG. 8.

Figure 8:
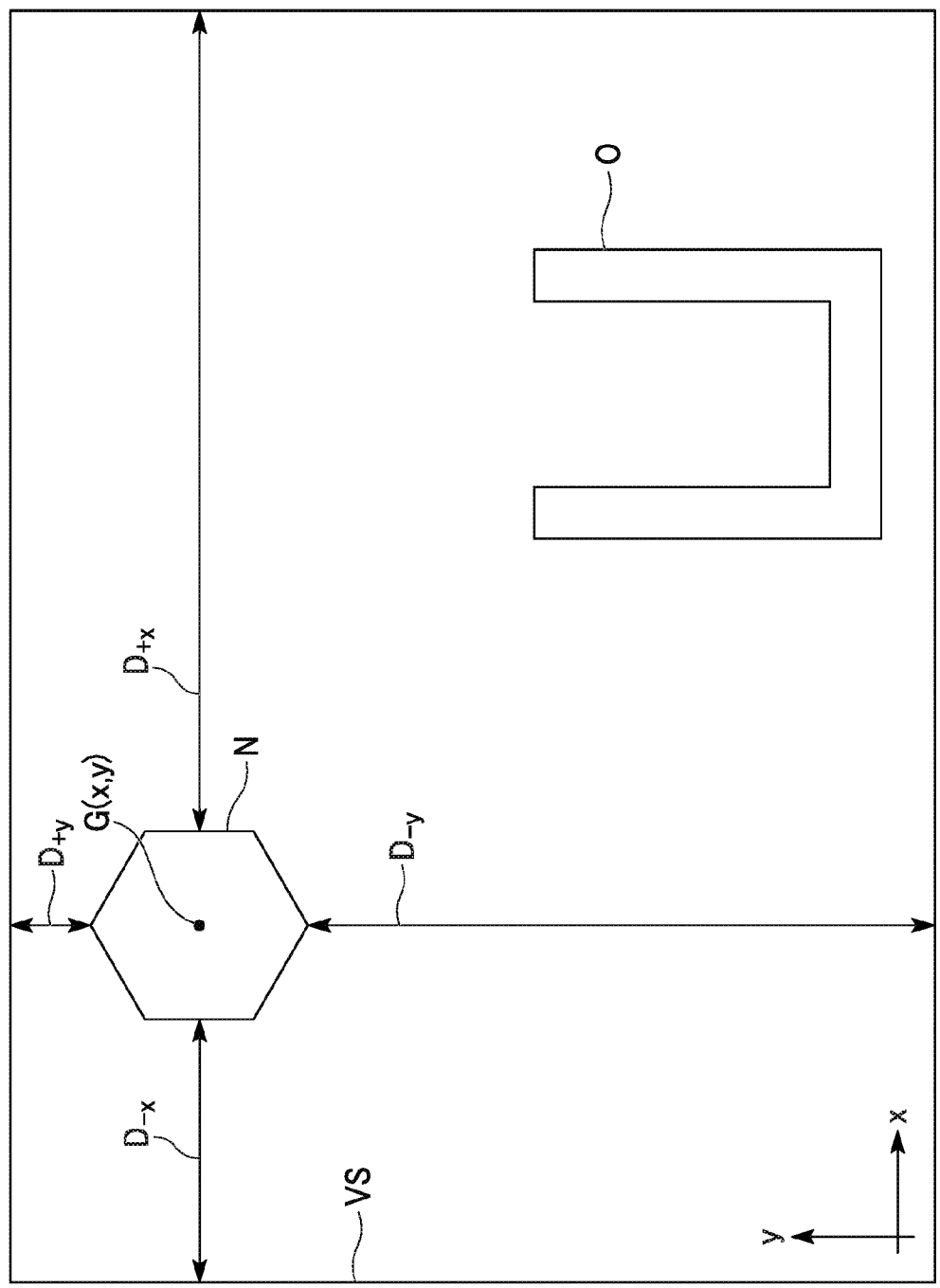
FIG. 8 is a view showing an example of the operational object N disposed at the point of the virtual space which is represented by the coordinates selected by the movable range calculator 37 in step S100.

FIG. 8 is a view showing an example of the operational object N disposed at the point of the virtual space which is represented by the coordinates selected by the movable range calculator 37 in step S100.

In the explanation with reference to FIG. 8, the point (x, y) are the coordinates selected by the movable range calculator 37 in step S200.

The point G (x, y) represents the position of the center of gravity of the operational object N disposed at the point (x, y) due to by the movable range calculator 37.

The frame VS shows the virtual space generated by the movable range calculator 37 and indicates the virtual space that represents the workspace.

Hereinafter, the range surrounded by the frame VS is referred to as the virtual space VS.

Particularly, the coordinate axes shown in FIG. 8 mean the coordinate axes that represent the position and the orientation on the virtual space VS.

Hereinafter, a case will be described where the orientation of the operational object N shown in FIG. 8 is a predetermined orientation.

The movable range calculator 37 transfers, in each of the above-mentioned four directions, the operational object N disposed at the point (x, y).

At this time, as the distance which the operational object N can move in each of the four directions, the movable range calculator 37 calculates the movement distance in the case where the operational object N transfers until the outline of the operational object N interferes with (i.e., comes into contact with) the frame of the virtual space VS or the outline of the assembly object O.

In FIG. 8, the distance $D_{+x}$ is the distance which the operational object N can move in the X-axis positive direction and the distance $D_{-x}$ is the distance which the operational object N can move in the X-axis negative direction.

Also, in FIG. 8, the distance $D_{+y}$ is the distance which the operational object N can move in the Y-axis positive direction and the distance $D_{-y}$ is the distance which the operational object N can move in the Y-axis negative direction.

The movable range calculator 37 adds the sum of the distance $D_{+x}$, the distance $D_{-x}$, the distance $D_{+y}$, and the distance $D_{-y}$ to the value stored in the variable number D.

Next, the movable range calculator 37 varies the orientation of the operational object N by a predetermined angle in increments to 360 degrees, calculates the sum of the distances which the operational object N can move in the above-described four directions at each timing at which the orientation of the operational object N is varied by the predetermined angle, and add the calculated sum of the distances which the operational object N can move in the four directions to the value stored in the variable number D.

The value of the sum of the distances which the operational object N can move in the four directions varies depending on the position and the orientation of the operational object N.

Consequently, the values which are to be cumulatively added to the variable number D are values depending on the position and the orientation of the operational object N.

The movable range calculator 37 carries out the processes from step S230 to step S260 in the above-described manner.

In contrast, in step S230, in the case where the cumulative value of the rotational angle regarding the rotation of the operational object N is determined to reach 360 degrees (step S230—Yes), the movable range calculator 37 sets the value stored in the variable number D as the translational movable-range $F_t$ in the coordinates selected by step S100 (step S270), thereafter returning to step S200, a subsequent point (coordinates) of the virtual space is selected.

Hereinafter, in the case where the coordinates of each point of the virtual space VS are defined as the point (x, y), the value of the translational movable-range $F_t$ at this point is represented as the translational movable-range $F_t$ (x, y).

Particularly, in the following example, a case will be described where the coordinates of each point of the virtual space and the coordinates of each point of the workspace correspond to each other in advance by calibration or the like.

Consequently, each of the points in the virtual space VS indicates each of the points in the workspace.

Figure 7:
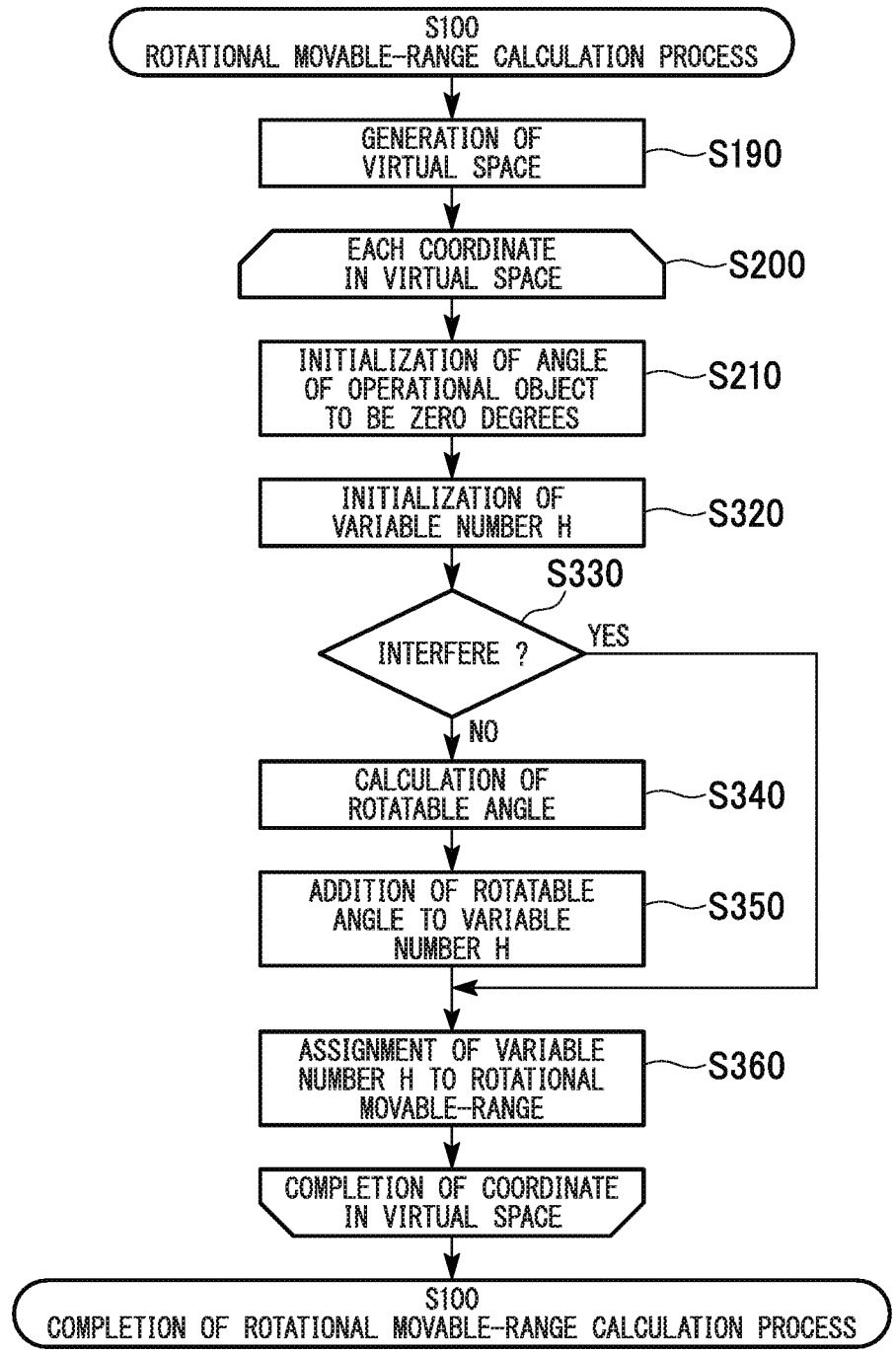
FIG. 7 is a flowchart showing an example of the flow of a rotational movable-range calculation process in the movable-range calculation process of step S100 shown in FIG. 5.

FIG. 7 is a flowchart showing an example of the flow of a rotational movable-range calculation process in the movable-range calculation process of step S100 shown in FIG. 5.

In the flowchart shown in FIG. 7, since the processes from step S190 to step S210 are the same as the processes from step S190 to step S210 of the flowchart shown in FIG. 6, the explanation therefor is omitted.

However, the movable range calculator 37 repeatedly carries out the processes from step S210 to step S360 of the flowchart shown in FIG. 7, for each of the coordinates selected by step S200 shown in FIG. 7.

In the case where the rotational movable-range calculation process is carried out by the movable range calculator 37 after the translational movable-range calculation process shown in FIG. 6 (or in parallel to translational movable-range calculation process), since the virtual space is generated in advance, it is not necessary to newly generate a virtual space in step S190 shown in FIG. 7.

After the process of step S210 shown in FIG. 7 is executed, the movable range calculator 37 generates the variable number H in which information indicating a numerical value can be stored, and initializes the value of the variable number H to be zero (step S320).

Next, the movable range calculator 37 determines whether or not the operational object N disposed at the point of the virtual space which is represented by the coordinates selected by step S200 interferes with (i.e., comes into contact with) the frame of the virtual space VS shown in FIG. 8 or the outline of the assembly object O at the moment (step S330).

In the case where the operational object N is determined not to come into contact with the frame of the virtual space VS or the outline of the assembly object O (step S330—No), the movable range calculator 37 rotates the operational object N disposed at the point of the virtual space which is represented by the coordinates selected by step S200, around, for example, the center of gravity of the operational object N in the positive direction and the negative direction, until the outline of the operational object N comes into contact with the frame of the virtual space VS or the outline of the assembly object O.

However, in the case where the outline of the operational object N does not come into contact with the frame of the virtual space VS or the outline of the assembly object O, the rotational angle in each of the positive direction and the negative direction is determined to be 360 degrees.

The movable range calculator 37 calculates, as the rotatable angle, the sum of the rotational angle in the positive direction and the rotational angle in the negative direction (step S340), and adds the rotatable angle to the value stored in the variable number H (step S350).

In contrast, in step S330, in the case where the operational object N is determined to interfere with (i.e., come into contact with) the frame of the virtual space VS or the outline of the assembly object O (step S330—Yes), the movable range calculator 37 sets the value stored in the variable number H as the rotational movable-range $F_r$ (step S360), thereafter, returning to step S200, a subsequent point (coordinates) of the virtual space is selected.

Hereinafter, in the case where the coordinates of each point of the virtual space VS are defined as the point (x, y), the value of the rotational movable-range $F_r$ at this point is represented as the rotational movable-range $F_r$ (x, y).

Hereinbelow, the movable-potential calculation process in step S110 shown in FIG. 5 will be described with reference to FIG. 9.

Figure 9:
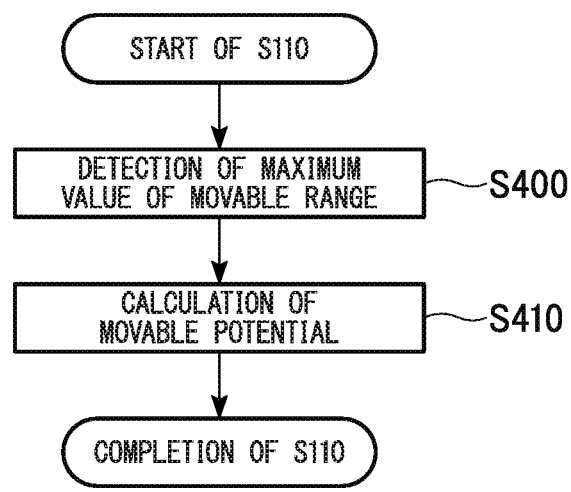
FIG. 9 is a flowchart showing an example of the flow of the movable-potential calculation process of step S110 shown in FIG. 5.

FIG. 9 is a flowchart showing an example of the flow of the movable-potential calculation process of step S110 shown in FIG. 5.

Firstly, the potential calculator 38 detects the maximum value $F_{tMAX}$ in all points of the translational movable-range $F_t$ (x, y) and the maximum value $F_{rMAX}$ in all points of the rotational movable-range $F_r$ (x, y), according to the movable range at each of the points (i.e., each of the points in the workspace) in the virtual space VS which are calculated by the movable range calculator 37 in step S100, that is, according to the translational movable-range $F_t$ (x, y) and the rotational movable-range $F_r$ (x, y) (step S400).

Next, the potential calculator 38 calculates a potential of each of the points in the workspace according to the maximum value $F_{tMAX}$ of the translational movable-range $F_t$ (x, y) and the maximum value $F_{rMAX}$ of the rotational movable-range $F_r$ (x, y) which are detected by step S400 (step S410).

Here, the process that calculates the potential will be described.

The potential calculator 38 calculates the movable potential of each of the points in the workspace in accordance with the following Formulas (1) to (3).

$$P_t(x,y) = F_{tMAX} - F_t(x,y) \quad (1)$$

$$P_r(x,y) = F_{rMAX} - F_r(x,y) \quad (2)$$

$$P_{t+r}(x,y) = P_t(x,y) + P_r(x,y) \quad (3)$$

Here, the $P_t(x, y)$ means the movable potential at the point (x, y) in the workspace and represents the movable potential that is to be calculated according to the translational movable-range (hereinbelow, referred to as a translational movable potential).

The $P_r(x, y)$ means the movable potential at the point (x, y) in the workspace and represents the movable potential that is to be calculated according to the rotational movable-range (hereinbelow, referred to as a rotational movable potential).

The $P_{t+r}(x, y)$ means the movable potential at the point (x, y) in the workspace and is the movable potential which is calculated by combining the translational movable potential and the rotational movable potential.

Hereinafter, in the case where the $P_{t+r}(x, y)$ is simply referred to as the movable potential, it means that the $P_{t+r}(x, y)$ is calculated by the aforementioned Formula (3).

The aforementioned Formula (1) is the Formula that defines the value obtained by subtracting the translational movable-range $F_t(x, y)$ at the point (x, y) in the workspace from the maximum value $F_{tMAX}$ of the translational movable-range, as the translational movable potential of the point (x, y).

By defining the translational movable potential as stated above, at the point at which the translational movable potential is large in the points in the workspace, it is possible to express that the rigidity of the operational object N gripped by the end effector E is large, that is, it is difficult to move the operational object N (translational movement is difficult).

In other words, the difficulty of movement of the operational object N as mentioned above represents that the operational object N is likely to interfere with the assembly object O or the other object by the translational operation of the operational object N.

The aforementioned Formula (2) is the Formula that defines the value obtained by subtracting the rotational movable-range $F_r(x, y)$ at the point (x, y) in the workspace from the maximum value $F_{rMAX}$ of the rotational movable-range, as the rotational movable potential of the point (x, y).

By defining the rotational movable potential as stated above, at the point at which the rotational movable potential is large in the points in the workspace, it is possible to express that the rigidity of the operational object N gripped by the end effector E is large, that is, it is difficult to move the operational object N (rotational movement is difficult).

In other words, the difficulty of movement of the operational object N as mentioned above represents that the operational object N is likely to interfere with the assembly object O or the other object by rotation of the operational object N.

Therefore, the point at which the movable potential $P_{t+r}(x, y)$ calculated by the aforementioned Formula (3) is large represents that the rigidity of the operational object N gripped by the end effector E is large, that is, it is difficult to move the operational object N (translational movement or rotational movement is difficult).

In other words, the difficulty of movement of the operational object N as mentioned above represents that the operational object N is likely to interfere with the assembly object O or the other object by the translational operation or the rotational operation of the operational object N.

Figure 10A:
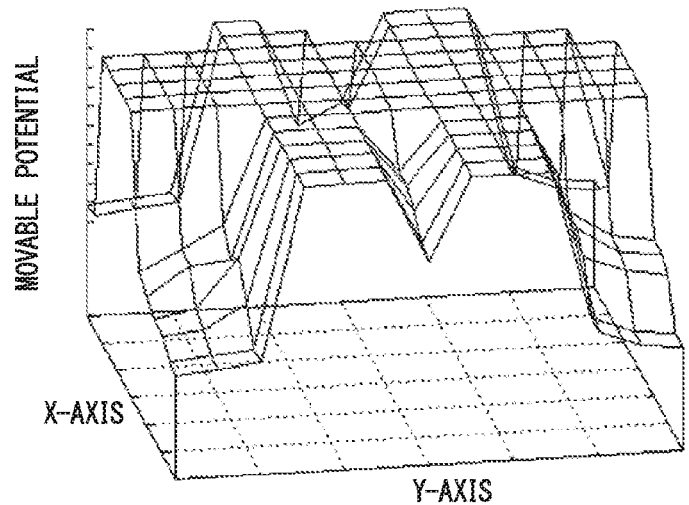
FIG. 10A is a chart showing an example of the movable potential.

FIG. 10A is a chart showing an example of the movable potential calculated in the above-described manner.

According to this chart, it is apparent that the value of the movable potential calculated by the potential calculator 38 discontinuously varies.

The reason for this is that, each of the values of the translational movable potential and the rotational movable potential which are used to calculate the movable potential discontinuously varies.

Figure 10B:
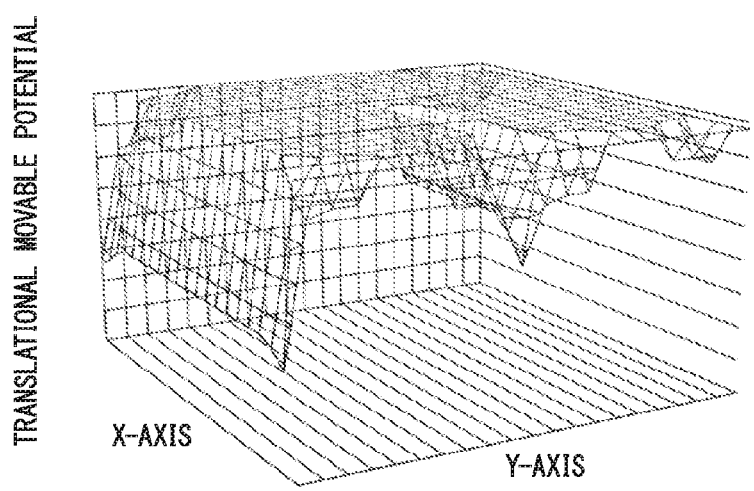
FIG. 10B is a chart showing an example of the translational movable potential.
Figure 10C:
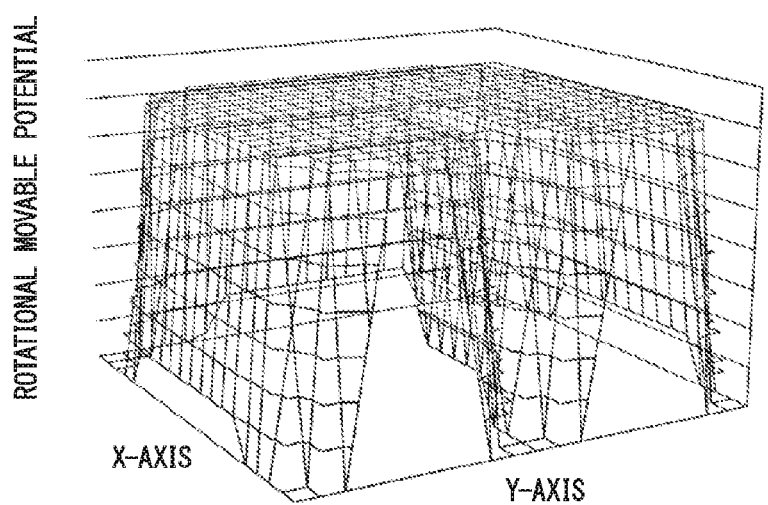
FIG. 10C is a chart showing an example of the rotational movable potential.

Here, regarding the movable potential, examples other than the case of FIG. 10A are shown in FIGS. 10B and 10C.

FIG. 10B is a chart showing an example of the translational movable potential and FIG. 10C is a chart showing an example of the rotational movable potential.

FIG. 10A shows an example of the resultant movable potential obtained by combining the translational movable potential and the rotational movable potential. For the other examples, FIGS. 10B and 10C separately show the examples of the translational movable potential and the rotational movable potential, respectively.

As described above, the examples are different from that in the case of FIG. 10A, and the result obtained by combining the translational movable potential and the rotational movable potential shown in FIGS. 10B and 10C is a movable potential different from the movable potential shown in FIG. 10A.

In the examples shown in FIGS. 10B and 10C, the values of the translational movable potential and the rotational movable potential discontinuously vary.

Hereinbelow, the distance potential calculation process in step S120 shown in FIG. 5 will be described with reference to FIG. 11.

Figure 11:
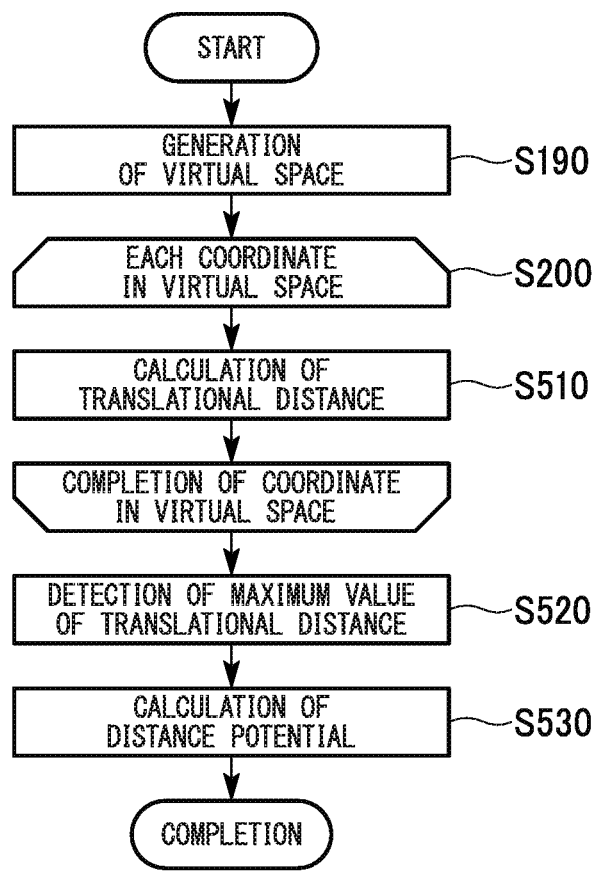
FIG. 11 is a flowchart showing an example of the flow of the distance potential calculation process of step S120 shown in FIG. 5.

FIG. 11 is a flowchart showing an example of the flow of the distance potential calculation process of step S120 shown in FIG. 5.

In the flowchart shown in FIG. 11, since the processes of step S190 and step S200 are the same as the processes of step S190 and step S200 of the flowchart shown in FIG. 6, the explanation therefor is omitted.

However, the functional unit that carries out the processes of step S190 and step S200 shown in FIG. 11 is not the movable range calculator 37 that carries out the processes of step S190 and step S200 shown in FIG. 6 but is the potential calculator 38.

The potential calculator 38 repeatedly carries out the process of step S510 of the flowchart shown in FIG. 11 for each of the coordinates selected by step S200 shown in FIG. 11.

Since the virtual space was generated step S100 as shown in FIG. 5 in advance, the potential calculator 38 may be configured to omit the process of step S190.

After the coordinates of the point of the virtual space in step S200 shown in FIG. 11 are selected, the potential calculator 38 reads in the information associated with the assembling position of the operational object N from the storage 32.

Hereinafter, a case will be described where the information associated with the assembling position of the operational object N is stored in the storage 32 in advance.

According to the read information associated with the assembling position of the operational object N and the coordinates selected by step S200, the potential calculator 38 calculates the distance from the assembling position to the position indicated by the coordinates, as a translational distance (step S510).

Here, the process of step S510 will be described with reference to FIG. 12.

Figure 12:
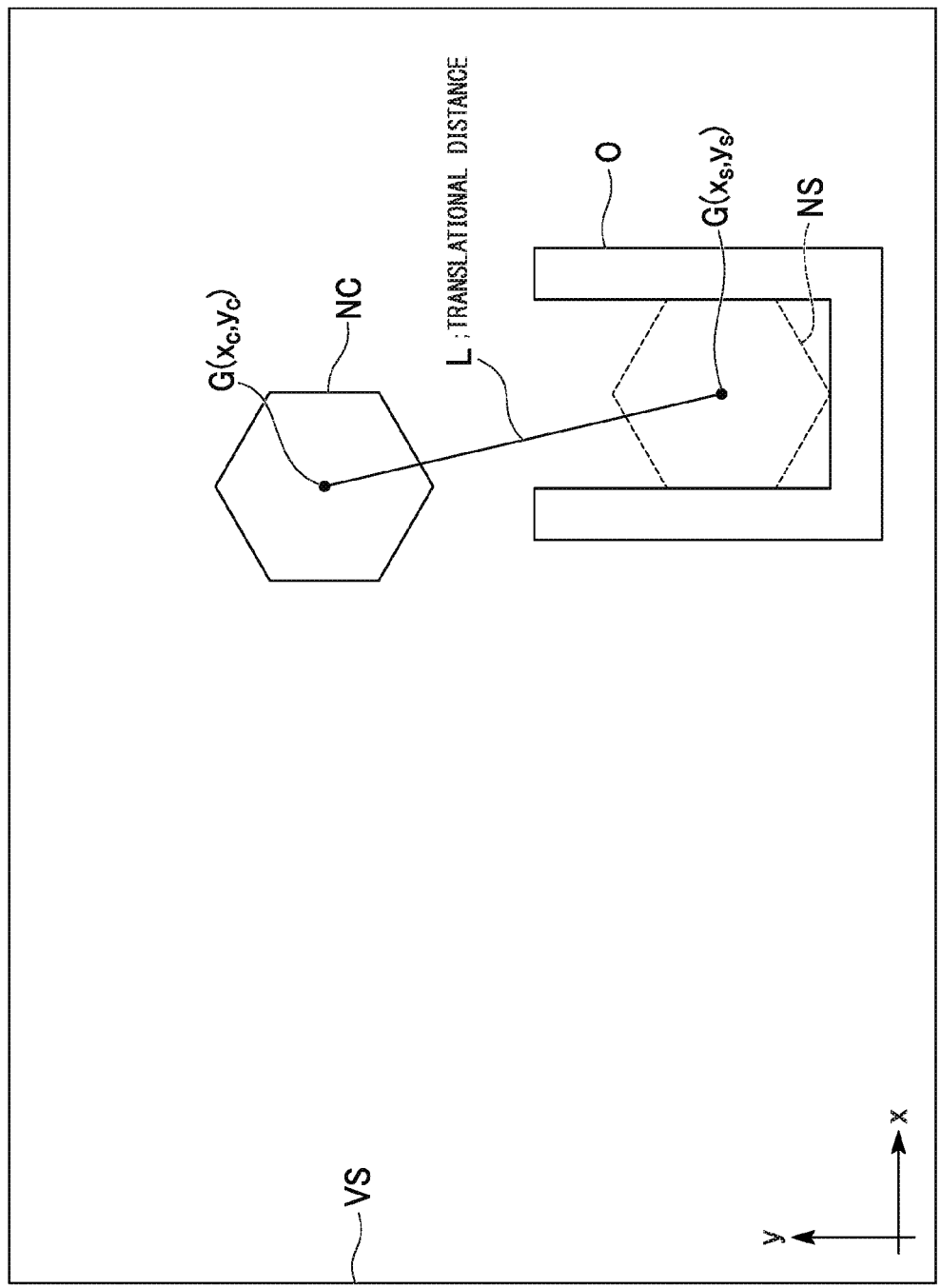
FIG. 12 is a diagram showing an example of the operational objects N which are disposed at: the point representing an assembling position of the operational object N; and the point of the virtual space which is represented by the coordinates selected by the potential calculator 38 in step S510.

FIG. 12 is a diagram showing an example of the operational objects N which are disposed at: the point representing an assembling position of the operational object N; and the point of the virtual space which is represented by the coordinates selected by the potential calculator 38 in step S510.

In FIG. 12, the broken line NS shows the outline of the operational object N disposed at the point G ($x_s$, $y_s$) representing the assembling position.

The solid line NC shows the outline of the operational object N disposed at the point G ($x_c$, $y_c$) of the virtual space which is represented by the coordinates selected by the potential calculator 38 in step S510.

As shown in FIG. 12, the potential calculator 38 calculates the distance L between the point G ($x_s$, $y_s$) and the point G ($x_c$, $y_c$) as the above-mentioned translational distance.

In FIG. 12, in order to explain the process of step S510, for example, the condition where the operational object N is disposed in the virtual space VS is described. In other cases, the potential calculator 38 may be configured to calculate the translational distance without disposing the operational object N in the virtual space VS, according to the coordinates of the point of the virtual space which represent the assembling position of the operational object N and the coordinates selected by the potential calculator 38 in step S510.

Hereinafter, in the case where the coordinates of each point of the virtual space VS are defined as the point (x, y), the value of the translational distance $S_t$ at this point is represented as the translational distance $S_t$ (x, y).

As mentioned above, the potential calculator 38 repeatedly carries out the processes from step S200 to step S510 shown in FIG. 11 and thereby calculates the distance between the assembling position of the operational object N and each of the points in the virtual space, as the translational distance $S_t$ (x, y).

Subsequently, the potential calculator 38 detects the maximum value $S_{tMAX}$ in all points of the translational distance $S_t$ (x, y) according to the translational distance $S_t$ (x, y) that is calculated in step S510 (step S520).

After that, the potential calculator 38 calculates the distance potential of each of the points in the workspace according to the maximum value $S_{tMAX}$ of the translational distance $S_t$ (x, y) which is detected in step S520 (step S530).

Here, the process that calculates the distance potential will be described.

The potential calculator 38 calculates the distance potential of each of the points in the workspace in accordance with the following Formula (4).

$$PT_t(x,y) = S_{tMAX} - S_t(x,y) \qquad (4)$$

Here, the $PT_t$ (x, y) means the distance potential at the point (x, y) in the workspace and represents the distance potential that is to be calculated according to the translational distance (hereinbelow, referred to as a translational distance potential).

The aforementioned Formula (4) is the Formula that defines the value obtained by subtracting the translational distance $S_t$ (x, y) at the point (x, y) in the workspace from the maximum value $S_{tMAX}$ of the translational distance, as the translational distance potential of the point (x, y).

By defining the translational distance potential as stated above, at the point at which the translational distance potential is large in the points in the workspace, it is possible to express that the operational object N is close to the assembling position, that is, the operational object N is located near the assembly object O.

In the case where, for example, another object does not exist between the operational object N and the assembly object O, since the operational object N does not come into contact with the assembly object O at the position at which the operational object N is located far from the assembly object O, the robot 20 can quickly transfer the operational object N.

Since the operational object N is very likely to come into contact with the assembly object O at the position at which the operational object N is located close to the assembly object O, it is preferable that the robot 20 slowly transfer the operational object N.

For this reason, the value of the translational distance potential $PT_t$ (x, y) at the point (x, y) can be represented as the reference of the speed at which the robot 20 can transfer the operational object N at the point (x, y).

Figure 13:
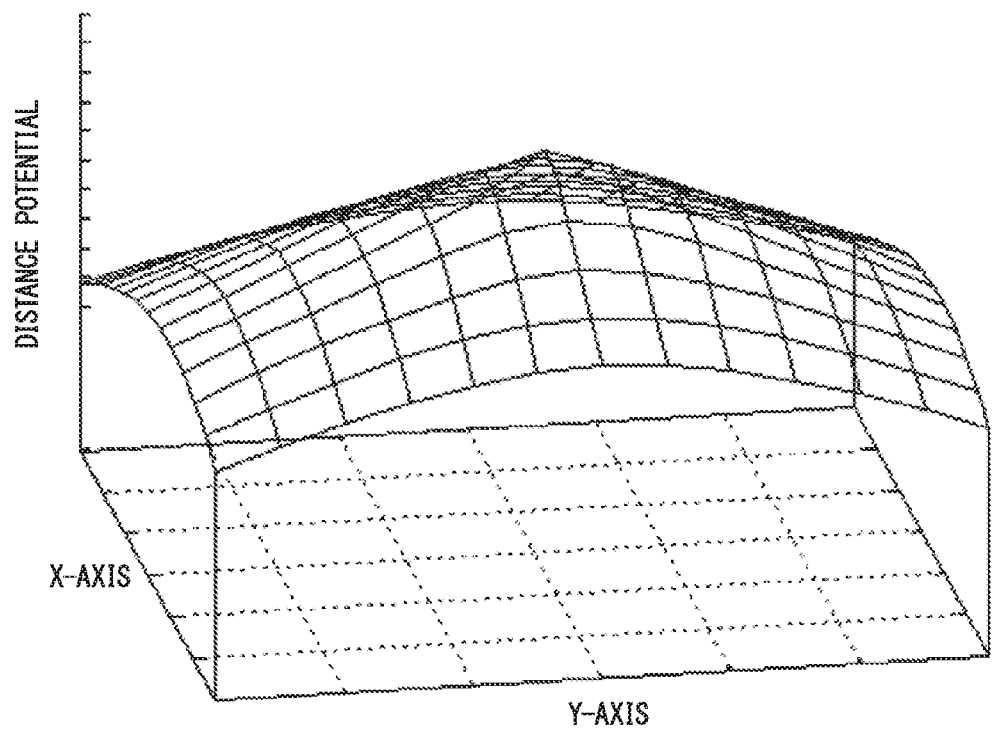
FIG. 13 is a chart showing an example of the translational distance potential calculated in the above-described manner.

FIG. 13 is a chart showing an example of the translational distance potential calculated in the above-described manner.

FIG. 13 is a chart showing an example of the translational distance potential.

From the chart shown FIG. 13, the translational distance potential calculated by the potential calculator 38 shows a upward projected shape, and it is apparent that the value thereof gradually decreases with an increase in a distance from the assembling position of the operational object N.

Particularly, the maximum value in the chart shown in FIG. 13 represents the value of the translational distance potential of the assembling position of the operational object N.

As mentioned above, the potential calculator 38 executes the processes from step S200 to step S530 shown in FIG. 11 and thereby can calculate the translational distance potential.

Figure 14:
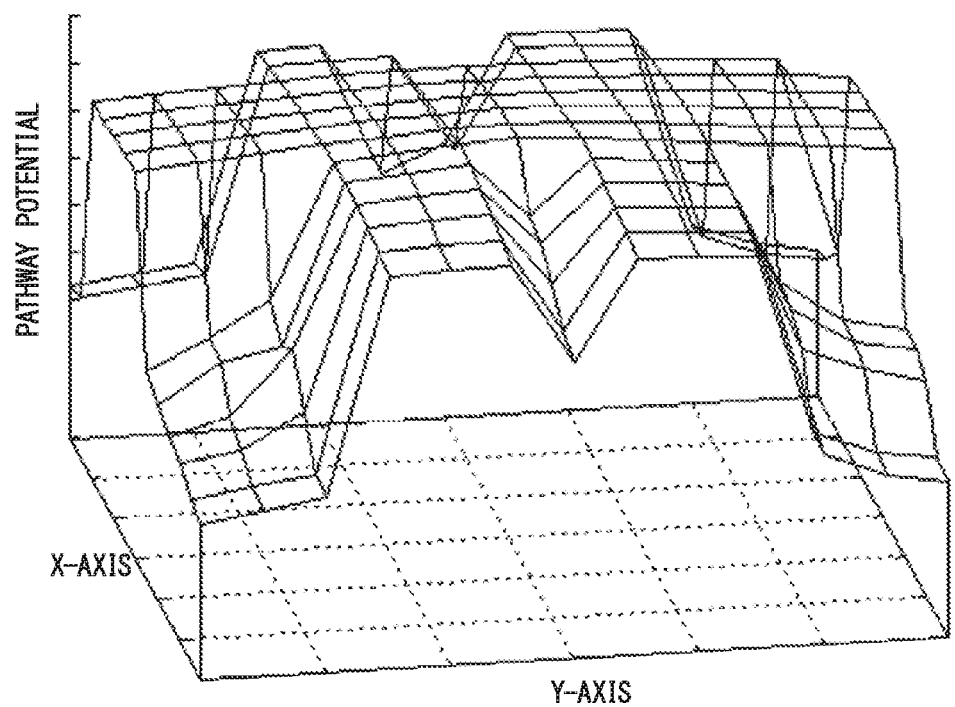
FIG. 14 is a chart showing an example of the pathway potential calculated by the potential calculator 38 by combining the movable potential and the translational distance potential in step S130.

FIG. 14 is a chart showing an example of the pathway potential calculated by the potential calculator 38 by combining the movable potential and the translational distance potential in step S130.

As shown in FIGS. 10A to 10C, since the value of the movable potential discontinuously varies, the value of the pathway potential calculated by the potential calculator 38 as shown in FIG. 14 discontinuously varies.

Figure 15:
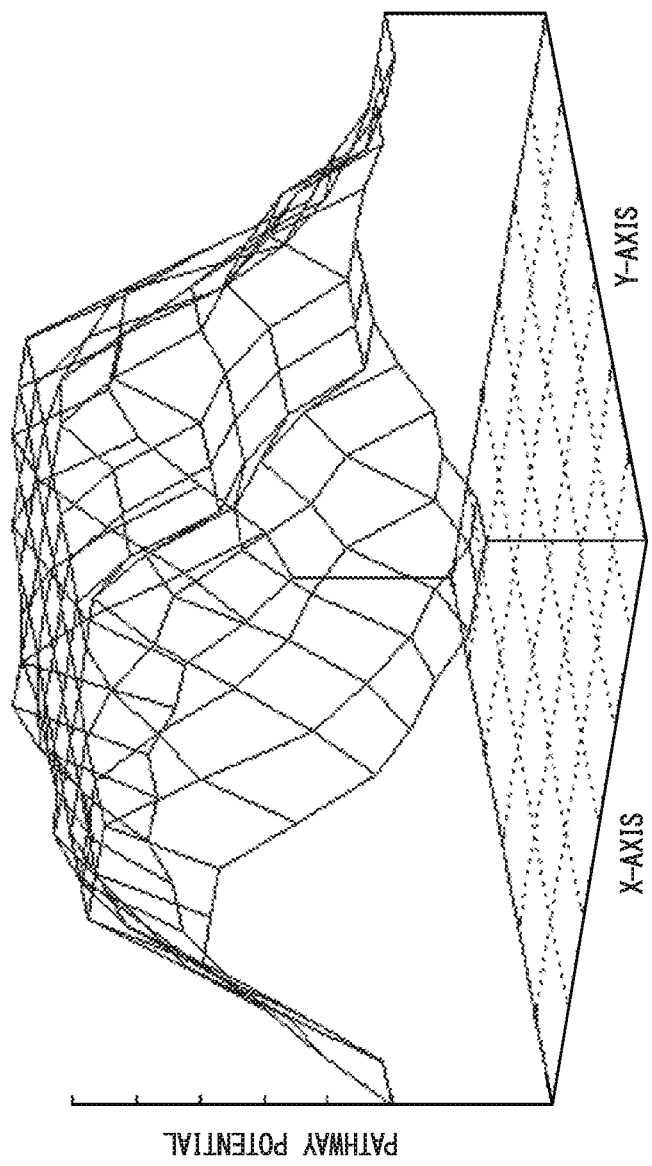
FIG. 15 is a chart showing an example of the pathway potential which has a smooth distribution and is generated by the smoothing processor 39.

Here, the smoothing processor 39 of the controller 36 which is provided in the control unit 30 passes the discontinuously-variable pathway potential through the low-pass filter in step S140 shown in FIG. 5, and thereby generates the pathway potential having a smooth distribution as shown in FIG. 15.

FIG. 15 is a chart showing an example of the pathway potential which has a smooth distribution and is generated by the smoothing processor 39.

Since the smoothing processor 39 generates the pathway potential having a smooth distribution as shown in FIG. 15, the robot controller 43 can cause the robot 20 to carry out a predetermined operation according to the pathway potential having a smooth distribution.

As a result, it is possible to reduce the load to be applied to the actuator of the manipulator M.

Here, the pathway generation process in step S150 shown in FIG. 5 will be particularly described with reference to the pathway potential shown in FIG. 15.

In FIG. 15, the position at which the value of the pathway potential is relatively lower than that of the other positions represents the position at which the operational object N is less likely to interfere with the assembly object O or the other object, is located far from the assembly object O, and is thereby the position at which it is possible to fast transfer the operational object N.

The position at which the value of the pathway potential is relatively higher than that of the other positions represents the position at which the operational object N is very likely to interfere with the assembly object O or the other object, is located close to the assembly object O, and is thereby the position at which it is required to slowly transfer the operational object N.

Consequently, when the robot 20 transfers the operational object N to incorporate it into the assembly object O, the robot 20 transfers the operational object N through the position at which the value of the pathway potential is low, and therefore, it is possible to prevent the operational object N or the robot from interfering with the other object and reduce the time needed to transfer the operational object N.

As the method of realizing the above effects, the pathway generator 40 in step S150 refers to the value of the pathway potential, and determines, as a via-point, the position at which the value of the pathway potential is lowest in the positions adjacent to the assembling position of the operational object N.

The via-point means the position through which the operational object N passes when the robot 20 transfers the operational object N from the initial position to the assembling position.

Hereinafter, for convenience of explanation, the position at which the operational object N is initially located is referred to as an initial position.

Here, the position adjacent to an arbitrary position X represents the position adjacent to the point of the coordinates indicating the arbitrary position X in the workspace.

In this example, the position in the workspace is the position of on the two-dimensional flat surface represented by the coordinate axes shown in FIG. 2 and is represented by the coordinate value of the coordinate axes.

The above coordinate value can be varied. As the variation of the coordinate value, mathematically, a small value such as a value extremely close to zero but not zero may be used.

However, the value extremely close to zero cannot be used as the variation in a practical control of the robot, it is required to use a limited minimum value as the variation.

Consequently, the position in the workspace according to this example is expressed by a plurality of grid points which are represented by the coordinate value indicated by the coordinate axes shown in FIG. 2.

That is, the position adjacent to an arbitrary position X represents the position represented by other grid point adjacent to the grid point representing the position X.

Hereinafter, for convenience of explanation, the position adjacent to an arbitrary position X is referred to as the adjacent position of the position X.

After the pathway generator 40 determines the via-point adjacent to the assembling position, the pathway generator 40 determines, as a subsequent via-point, the coordinates of the point at which the value of the pathway potential is lowest in the positions adjacent to the via-point.

By repeatedly carrying out such determination, the pathway generator 40 connects the assembling position and the initial position with a plurality of via-points interposed therebetween.

Accordingly, the pathway generator 40 connects the positions adjacent to each other by line which are selected from the assembling position, the initial position, and the aforementioned plurality of the via-points and thereby generates the pathway used to incorporate the operational object N into the assembly object O.

Particularly, when the pathway generator 40 determines the via-point, in the case where there are two or more of positions at which the values of the pathway potentials are the same as each other, for example, the pathway generator 40 determines, as a subsequent via-point, the position of the two or more of positions which is closest to the initial position of the operational object N.

The case is described in this example where the pathway generator 40 does not re-determine, as a subsequent via-point, the via-point through which the operational object N passed one time. Instead of the above-described case, the pathway generator 40 may be configured to re-determine, as a subsequent via-point, the via-point through which the operational object N passed one time.

In this case, it is necessary to prevent repeatedly carrying out determination of the via-point between two via-points, for example, the pathway generator 40 does not select the previously determined via-point as a subsequent via-point.

Here, the speed determination process of step S160 shown in FIG. 5 will be particularly described.

The speed determiner 41 determines the speed at which the robot 20 transfers the operational object N at each of the via-points which were determined by the pathway generator 40 in step S150.

In this determination, the speed determiner 41 refers to the value of the pathway potential shown in, for example, FIG. 15, and calculates, as the speed at which the robot 20 transfers the operational object N at each of the plurality of the via-points, the value obtained by multiplying the reciprocal number of the value of the pathway potential of each of the plurality of the via-points by a predetermined speed.

In other cases, the speed determiner 41 may be configured to calculate, as the speed at which the robot 20 transfers the operational object N at each of the plurality of the via-points, the value obtained by adding a predetermined speed to the reciprocal number of the value of the pathway potential of each of the plurality of the via-points. The speed determiner 41 may be configured to calculate, as the speed at which the robot 20 transfers the operational object N at each of the plurality of the via-points, the value obtained by: multiplying the reciprocal number of the value of the pathway potential of each of the plurality of the via-points by a predetermined weight; and multiplying the resultant weighted value by a predetermined speed. The speed determiner 41 may be configured to calculate the speed at which the robot 20 transfers the operational object N at each of the plurality of the via-points by other calculation method using the reciprocal number of the value of the pathway potential.

The speed determiner 41 may set an upper limit of the speed at which the robot 20 transfers the operational object N at each of the plurality of the via-points.

For example, the speed determiner 41 may be configured so that, in the case where a reciprocal value of the reciprocal numbers of the values of the pathway potentials of the plurality of the via-points exceeds a predetermined upper limit, the upper limit is updated so that the value of the exceeding reciprocal value is used as the updated upper limit, and the updated upper limit is adopted as the upper limit of the speed at which the robot 20 transfers the operational object N at each of the plurality of the via-points.

Here, the speed at each of the via-points which is determined by the speed determiner 41 discontinuously varies between the via-points adjacent to each other.

That is, in the case where the robot 20 transfers the operational object N according to the speeds which discontinuously vary and are determined by the speed determiner 41, a superfluous load may be applied to the actuator or the like provided in the robot 20.

In order to reduce such load, the speed determiner 41 carries out fitting of the function representing variation in the speed determined at each via-point by use of, for example, a fifth-order polynomial equation so that the speed determined at each via-point continuously (smoothly) varies between the via-points adjacent to each other, and thereby smooths (average) the function.

In other cases, instead of the fifth-order polynomial equation, the speed determiner 41 may be configured to carry out the fitting of the function by use of other polynomial equations, a special function, a trigonometric function, or the like.

As described above, the robotic system 1 (or the robot 20) according to the first embodiment generates the pathway according to: the relative position and the relative orientation of the assembly object O and the operational object N moving along with the arm; and the initial position of the operational object N.

Accordingly, the robotic system 1 can transfer the operational object N along the pathway according to: the relative position and the relative orientation of the operational object N and the assembly object O; and the assembling position of the operational object N.

Consequently, the robotic system 1 can prevent, for example, the operational object N or the robot from interfering with the other object and reduce the time needed to transfer the operational object N.

The robotic system 1 generates the pathway by use of the range in which the operational object N is movable according to the relative position and the relative orientation of the operational object N and the assembly object O.

In this way, the robotic system 1 can transfer the operational object N along the pathway generated by use of the range in which the operational object N is movable.

According to the range in which the operational object N is movable, the robotic system 1 calculates the movable potential that means the value which represents the degree of difficulty in movement of the operational object N or the degree of ease of movement thereof, which corresponds to the relative position and the relative orientation of the operational object N and the assembly object O, and the robotic system generates the pathway by use of the calculated movable potential.

Therefore, the robotic system 1 can transfer the operational object N along the pathway generated by use of the movable potential.

The robotic system 1 generates the pathway by use of the assembling position of the operational object N and other position of the operational object N in the workspace.

Consequently, the robotic system 1 can transfer the operational object N along the pathway generated by use of the assembling position of the operational object N and other position of the operational object N in the workspace.

The robotic system 1 determines the moving speed of the arm according to: the relative position and the relative orientation of the operational object N and the assembly object O; and the assembling position of the operational object N.

Accordingly, the robotic system 1 can transfer the operational object N at the speed determined according to: the relative position and the relative orientation of the operational object N and the assembly object O; and the assembling position of the operational object N.

The robotic system 1 determines the moving speed of the arm by use of the range which is according to the relative position and the relative orientation of the operational object N and the assembly object O and in which the operational object N is movable.

Therefore, the robotic system 1 can transfer the operational object N at the speed determined by use of the range in which the operational object N is movable.

The robotic system 1 calculates the movable potential that means the value which represents the degree of difficulty in movement of the operational object N or the degree of ease of movement thereof, which corresponds to the relative position and the relative orientation of the operational object N and the assembly object O, and the robotic system determines the moving speed of the arm by use of the calculated movable potential.

Therefore, the robotic system 1 can transfer the operational object N at the speed determined by use of the movable potential.

The robotic system 1 determines the moving speed of the arm by use of the assembling position of the operational object N and other position of the operational object N in the workspace.

Consequently, the robotic system 1 can transfer the operational object N at the speed determined by use of the assembling position of the operational object N and other position of the operational object N in the workspace.

Second Embodiment

Hereinafter, a second embodiment of the invention will be described with reference to drawings.

In the second embodiment, identical reference numerals and identical reference letters are used for the elements which are identical to those of the first embodiment.

In the second embodiment, the controller 36 includes a movable range calculator 37a and a potential calculator 38a instead of the movable range calculator 37 and the potential calculator 38.

Instead of the movable-range calculation process which is carried out by the movable range calculator 37 in step S100, the movable range calculator 37a carries out the movable-range calculation process which will be described below.

Figure 16:
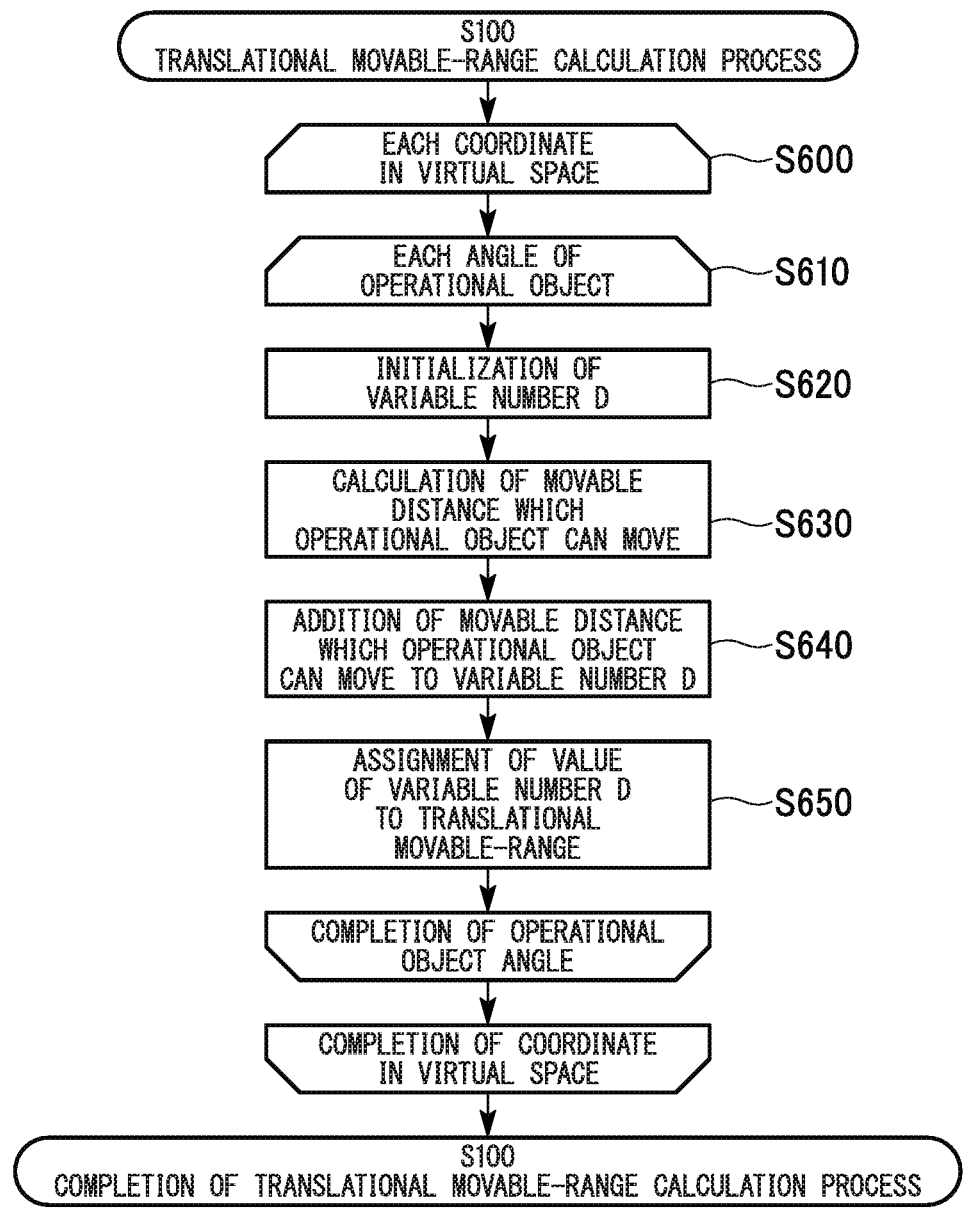
FIG. 16 is a flowchart showing an example of the flow of a translational movable-range calculation process which is carried out by the movable range calculator 37*a*.
Figure 17:
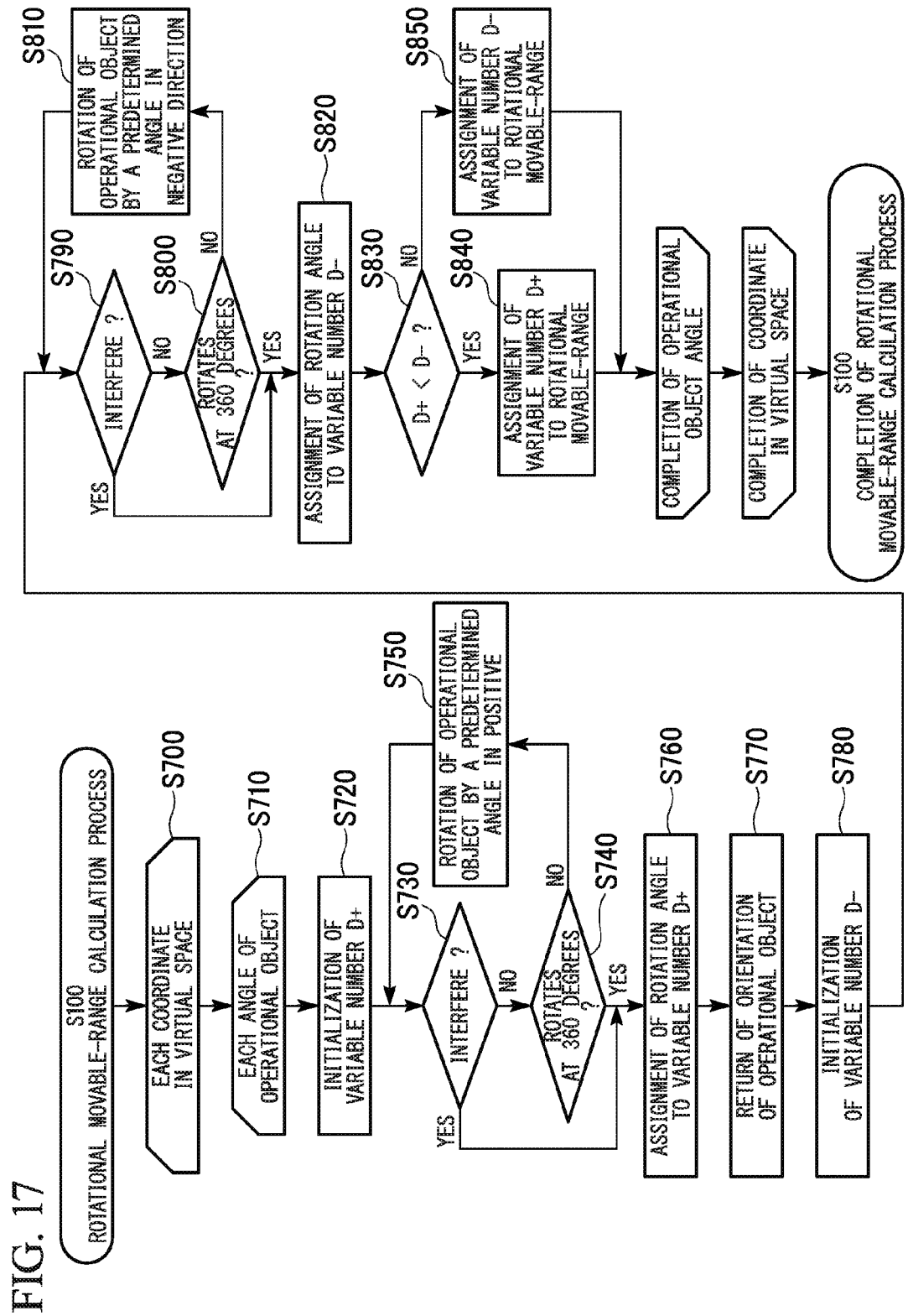
FIG. 17 is a flowchart showing an example of the flow of a rotational movable-range calculation process which is carried out by the movable range calculator 37*a*.

More particularly, in step S100, the movable range calculator 37a carries out the translational movable-range calculation process shown in FIG. 16 and the rotational movable-range calculation process shown in FIG. 17.

Instead of the distance potential calculation process which is carried out by the potential calculator 38 in step S120, the potential calculator 38a carries out the stance potential calculation process which will be described below.

Figure 18:
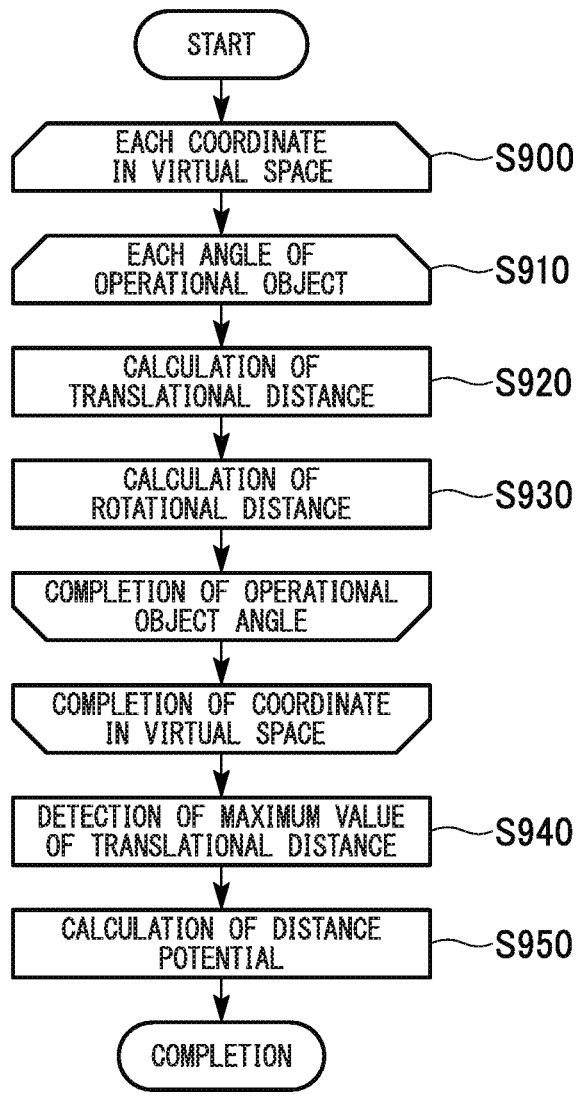
FIG. 18 is a flowchart showing an example of the flow of a distance potential calculation process which is carried out by the potential calculator 38*a*.

More particularly, in step S120, the potential calculator 38a carries out the distance potential calculation process shown in FIG. 18.

Hereinbelow, the translational movable-range calculation process which is carried out by the movable range calculator 37a will be described with reference to FIG. 16.

FIG. 16 is a flowchart showing an example of the flow of a translational movable-range calculation process which is carried out by the movable range calculator 37a.

The translational movable-range calculation process shown in FIG. 16 is different from the translational movable-range calculation process that calculates the translational movable-range shown in FIG. 6 as a positional function, and calculates the translational movable-range as a function associated with the position and the orientation.

Firstly, the movable range calculator 37a reads in information associated with the workspace from the storage 32, and according to the read information associated with the workspace, the movable range calculator generates the virtual space that represents the workspace.

Subsequently, the movable range calculator 37a selects the coordinates of each point of the generated virtual space one by one, and repeatedly carries out the processes from step S610 to step S650 for each point of the selected coordinates (step S600).

Next, the movable range calculator 37a ideally disposes the operational object N at the point of the virtual space which is represented by the coordinates selected by step S600.

At this time, the movable range calculator 37a disposes the operational object N so that the position of the center of gravity of the operational object N coincides with the point of the virtual space.

The movable range calculator 37a rotates the operational object N until the orientation of the operational object N disposed at the point of the virtual space becomes a predetermined initial orientation.

Furthermore, the movable range calculator 37a varies the orientation of the operational object N by a predetermined angle in increments and repeatedly carries out the processes from step S620 to step S650 for each orientation (step S610).

Subsequently, the movable range calculator 37a generates the variable number D in which information indicating a numerical value can be stored, and initializes the value of the variable number D to be zero (step S620).

Next, the movable range calculator 37a calculates the sum of the distances in the four directions (i.e., the X-axis positive direction, the X-axis negative direction, the Y-axis positive direction, the Y-axis negative direction) in which the operational object N can move (step S630). Here, this operational object N means the operational object N which is disposed at the point of the virtual space which is represented by the coordinates selected by step S600 in the orientation selected by step S610.

After that, the movable range calculator 37a adds the sum of the distances which is calculated by step S630 and at which the operational object N can move in the four directions, to the value stored in the variable number D generated in step S620 (step S640).

Hereinbelow, the rotational movable-range calculation process which is carried out by the movable range calculator 37a will be described with reference to FIG. 17.

FIG. 17 is a flowchart showing an example of the flow of a rotational movable-range calculation process which is carried out by the movable range calculator 37a.

The rotational movable-range calculation process shown in FIG. 17 is different from the rotational movable-range calculation process that calculates the rotational movable-range shown in FIG. 7 as a positional function, and calculates the rotational movable-range as a function associated with the position and the orientation.

Firstly, the movable range calculator 37a reads in information associated with the workspace from the storage 32, and according to the read information associated with the workspace, the movable range calculator generates the virtual space that represents the workspace.

Subsequently, the movable range calculator 37a selects the coordinates of each point of the generated virtual space one by one, and repeatedly carries out the processes from step S710 to step S850 for each point of the selected coordinates (step S700).

In the case where the rotational movable-range calculation process is carried out by the movable range calculator 37a after the translational movable-range calculation process shown in FIG. 13 (or in parallel), since the virtual space is generated in advance, it is not necessary to newly generate a virtual space in step S700.

Next, the movable range calculator 37a ideally disposes the operational object N at the point of the virtual space which is represented by the coordinates selected by step S700.

At this time, the movable range calculator 37a disposes the operational object N so that the position of the center of gravity of the operational object N coincides with the point of the virtual space.

The movable range calculator 37a rotates the operational object N until the orientation of the operational object N disposed at the point of the virtual space becomes a predetermined initial orientation.

Furthermore, the movable range calculator 37a varies the orientation of the operational object N by a predetermined angle in increments and repeatedly carries out the processes from step S720 to step S850 for each orientation (step S710).

Subsequently, the movable range calculator 37a generates the variable number D+ that can store information indicating a numerical value, and initializes the value of the variable number D+ to be zero (step S720).

Next, the movable range calculator 37a determines whether or not the operational object N interferes with (i.e., comes into contact with) the frame of the virtual space VS or the outline of the assembly object O as shown in FIG. 8 (step S730). Here, this operational object N means the operational object N that is disposed at the point of the virtual space which is represented by the coordinates selected by step S700 and is in the current orientation.

In the case where the operational object N is determined not to come into contact with the frame of the virtual space VS or the outline of the assembly object O (step S730—No), the movable range calculator 37a determines whether or not the cumulative value of the rotational angle regarding the rotation of the operational object N in step S750 reaches 360 degrees (step S740).

In the case where the cumulative value of the rotational angle regarding the rotation of the operational object N is determined not to reach 360 degrees (step S740—No), for example, the movable range calculator 37a rotates the operational object N in the positive direction by a predetermined angle around the center of gravity of the operational object N (step S750), and re-carries out the determination of step S730. Here this operational object N means the operational object N that is disposed at the point of the virtual space which is represented by the coordinates selected by step S700 and is in the current orientation.

It is preferable that "a predetermined angle" be an arbitrary angle and that one of multiple numbers of the predetermined angle be 360 degrees, for this example, 5 degrees, 10 degrees, or the like is preferable; however, another angle of which one of the multiple numbers is not 360 degrees may be adopted.

In contrast, in the case where the cumulative value of the rotational angle regarding the rotation of the operational object N is determined to reach 360 degrees (step S740—Yes), the movable range calculator 37a assigns the cumulative value of the rotational angle regarding the rotation of the operational object N in step S750 to the variable number D+ (step S760).

In contrast, in step S730, in the case where the operational object N is determined to interfere with (i.e., comes into contact with) the frame of the virtual space VS or the outline of the assembly object O (step S730—Yes), the movable range calculator 37*a* execute step S760, that is, assigns the cumulative value of the rotational angle regarding the rotation of the operational object N in step S750 to variable number D+.

Subsequently, the movable range calculator 37*a* returns the orientation of the operational object N disposed at the point of the virtual space which is represented by the coordinates selected by step S700, to the orientation selected by step S710 (step S770).

After that, the movable range calculator 37*a* generates the variable number D− that can store information indicating a numerical value, and initializes the value of the variable number D− to be zero (step S780).

Next, the movable range calculator 37*a* determines whether or not the operational object N interferes with (i.e., comes into contact with) the frame of the virtual space VS or the outline of the assembly object O as shown in FIG. 8 (step S790). Here, this operational object N means the operational object N that is disposed at the point of the virtual space which is represented by the coordinates selected by step S700 and is in the current orientation.

In the case where the operational object N is determined not to come into contact with the frame of the virtual space VS or the outline of the assembly object O (step S790—No), the movable range calculator 37*a* determines whether or not the cumulative value of the absolute value of the rotational angle regarding the rotation of the operational object N in step S810 reaches 360 degrees (step S800).

In the case where the cumulative value of the rotational angle regarding the rotation of the operational object N is determined not to reach 360 degrees (step S800—No), for example, the movable range calculator 37*a* rotates the operational object N in the negative direction by a predetermined angle around the center of gravity of the operational object N (step S810), and re-carries out the determination of step S790. Here this operational object N means the operational object N that is disposed at the point of the virtual space which is represented by the coordinates selected by step S700 and is in the current orientation.

It is preferable that "a predetermined angle" be an arbitrary angle and that one of multiple numbers of the predetermined angle be 360 degrees, for this example, 5 degrees, 10 degrees, or the like is preferable; however, another angle of which one of the multiple numbers is not 360 degrees may be adopted.

In contrast, regarding the rotation of the operational object N, in the case where the cumulative value of the rotational angle is determined to reach 360 degrees (step S800—Yes), the movable range calculator 37*a* assigns the cumulative value of the rotational angle regarding the rotation of the operational object N in step S810 to the variable number D− (step S820).

In contrast, in step S790, in the case where the operational object N is determined to interfere with (i.e., comes into contact with) the frame of the virtual space VS or the outline of the assembly object O (step S790—Yes), the movable range calculator 37*a* execute step S820, that is, assigns the cumulative value of the rotational angle regarding the rotation of the operational object N in step S810 to variable number D−.

Subsequently, the movable range calculator 37*a* determines whether or not the value that is assigned to the variable number D+ is less than the value that is assigned to the variable number D− (step S830).

In the case where the value that is assigned to variable number D+ is determined to be less than the value that is assigned to variable number D− (step S830—Yes), the movable range calculator 37*a* assigns the value of the variable number D+ to the rotational movable-range (step S840).

In contrast, in the case where the value that is assigned to variable number D+ is determined to be greater than or equal to the value that is assigned to variable number D− (step S830—No), the movable range calculator 37*a* assigns the value of the variable number D− to the rotational movable-range (step S850).

As stated above, the movable range calculator 37*a* repeatedly carries out the processes from step S600 to step S650 and the processes from step S700 to step S850, and thereby calculates the translational movable-range and the rotational movable-range of the operational object N at each point in the workspace for each orientation of the operational object N.

In other cases, the movable range calculator 37*a* may be configured to determine whether or not the value that is assigned to variable number D− less than the value that is assigned to variable number D+ in step S730.

The movable range calculator 37*a* may be configured to carry out the processes from step S730 to step S760 and the processes from step S780 to step S820 in the inverse order or at the same time.

Hereinbelow, the distance potential calculation process which is carried out by the potential calculator 38*a* will be described with reference to FIG. 18.

FIG. 18 is a flowchart showing an example of the flow of a distance potential calculation process which is carried out by the potential calculator 38*a*.

The distance potential calculation process shown in FIG. 18 is different from the distance potential calculation process that calculates the distance potential shown in FIG. 11 as a positional function (i.e., translational distance potential), calculates the distance potential as a function associated with the position and the orientation.

Firstly, the potential calculator 38*a* reads in information associated with the workspace from the storage 32, and according to the read information associated with the workspace, the movable range calculator generates the virtual space that represents the workspace.

Subsequently, the potential calculator 38*a* selects the coordinates of each point of the generated virtual space one by one, and repeatedly carries out the processes from step S910 step S930 for each point of the selected coordinates (step S900).

In the case where the rotational movable-range calculation process is carried out by the movable range calculator 37*a* after the translational movable-range calculation process shown in FIG. 16 (or in parallel), since the virtual space is generated in advance, it is not necessary to newly generate a virtual space in step S900.

Next, the potential calculator 38*a* ideally disposes the operational object N at the point of the virtual space which is represented by the coordinates selected by step S900.

At this time, the potential calculator 38*a* disposes the operational object N so that the position of the center of gravity of the operational object N coincides with the point of the virtual space.

The potential calculator 38a rotates the operational object N until the orientation of the operational object N disposed at the point of the virtual space becomes a predetermined initial orientation.

Furthermore, the potential calculator 38a varies the orientation of the operational object N by a predetermined angle in increments and repeatedly carries out the processes from step S920 to step S930 for each orientation (step S910).

The potential calculator 38a calculates, as the translational distance $S_t(x, y)$, the distance between the assembling position of the operational object N in the workspace and the position which is represented by the point (x, y) selected by step S900 (step S920).

After that, the potential calculator 38a uses the following Formula, calculates, as the rotational distance $S_r(\theta)$, between: the angle vector $\theta_s$ (orientation vector) that represents the assembling orientation of the operational object N corresponding to the assembling position of the operational object N in, for example, the workspace; and the angle vector $\theta$ that represents the orientation of the operational object N selected by step S920.

$$S_r(\theta) = \sqrt{(\theta_s - \theta)^2}$$

As a result of repeatedly carrying out the processes from step S900 to step S930, the potential calculator 38a can calculate the translational distance $S_t(x, y)$ and the rotational distance $S_r(\theta)$ for each of all positions and each of all orientation in the virtual region.

Subsequently, the potential calculator 38a calculates the total distance $S_{total}(x, y, \theta)$ obtained by combining the translational distance $S_t(x, y)$ and the rotational distance $S_r(\theta)$ which were calculated by reiteration of the processes from step S900 to step S930.

Next, the potential calculator 38a detects the maximum value $S_{MAX}$ in all points of the calculated total distance $S_{total}(x, y, \theta)$ (step S940).

After that, the potential calculator 38a calculates the distance potential of each of the points in the workspace according to the maximum value $S_{MAX}$ of the total distance $S_{total}(x, y, \theta)$ detected in step S940 (step S950).

More specifically, the potential calculator 38a calculates the distance potential of each of the points in the workspace in accordance with the following Formula (5).

$$PT(x,y,\theta) = S_{MAX} - S_{total}(x,y,\theta) \quad (5)$$

Here, the PT $(x, y, \theta)$ means the distance potential at the position and the orientation $(x, y, \theta)$ in the workspace and represents the distance potential that is to be calculated according to the translational distance and the rotational distance.

The aforementioned Formula (5) is the Formula that defines the value obtained by subtracting the total distance S (total $(x, y, \theta)$ in the position and the orientation $(x, y, \theta)$ in the workspace from the maximum value $S_{MAX}$ of the total distance, as the distance potential at the position and the orientation $(x, y, \theta)$.

By defining the distance potential as described above, at the point at which the distance potential thereof is large in the points in the workspace, it is possible to express that the operational object N is close to the assembling position, that is, the operational object N is located near the assembly object O.

As described above, the robotic system 1 according to the second embodiment generates the pathway by use of: the assembling position of the operational object N; the assembling orientation of the operational object N corresponding to the assembling position thereof; and other position and other orientation in the workspace of the operational object N.

Accordingly, the robotic system 1 can transfer the operational object N along the pathway generated by use of: the assembling position of the operational object N; the assembling orientation of the operational object N corresponding to the assembling position thereof; and other position and other orientation in the workspace of the operational object N.

The robotic system 1 determines the moving speed of the arm by use of: the assembling position of the operational object N; the assembling orientation of the operational object N corresponding to the assembling position thereof; and other position and other orientation in the workspace of the operational object N.

As a result, the robot can transfer the operational object N at the speed determined by use of: the assembling position of the operational object N; the assembling orientation of the operational object N corresponding to the assembling position thereof; and other position and other orientation in the workspace of the operational object N.

Particularly, the assembling position is an example of each of the first position and the third position.

The assembling orientation is an example of each of the first orientation corresponding to the first position and the third orientation corresponding to the third position.

While embodiments of the invention have been described and shown above, it should be understood that these are exemplary of the invention and are not to be considered as limiting. Additions, omissions, substitutions, and other modifications can be made without departing from the scope of the invention.

Computer program that realizes the functions of the constituent units which constitute the above-described device (for example, the control unit 30 of the robotic system 1) may be stored in a computer readable storage medium, and the computer program may be read in a computer system and thereby executed.

Here, the computer system has hardware resources which may include an OS (Operating System) and peripheral devices. The computer system also has a WWW system that provides a homepage service (or viewable) environment.

The above computer readable storage medium is a storage device, for example, a portable medium such as a flexible disk, a magneto optical disk, a ROM (Read Only Memory), or a CD (Compact Disk)-ROM, or a memory device such as a hard disk built in a computer system.

The computer readable storage medium also includes a device for temporarily storing the program, such as a volatile memory (RAM: Random Access Memory) in a computer system which functions as a server or client and receives the program via a network (e.g., the Internet) or a communication line (e.g., a telephone line).

The above program, stored in a memory device or the like of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such (e.g., a telephone line).

In addition, the program may execute part of the above-explained functions. The program may also be a "differential" program so that the above-described functions can be executed by a combination program of the differential program and an existing program which has already been stored in the relevant computer system.

What is claimed is:

1. A robot comprising:
   an arm; and
   a controller that operates the arm,
   wherein the controller generates a pathway according to:
      a relative position and a relative orientation between a first object and a second object; and
      a first position of the first object, the first object being moved together with the arm,
   wherein the controller generates the pathway by use of a first object movable range according to the relative position and the relative orientation, and
   wherein according to the first object movable range, the controller calculates a value which represents a degree of difficulty in movement of the first object or a degree of ease in movement of the first object depending on the relative position and the relative orientation, and the controller generates the pathway by use of the value which represents the degree.

2. The robot according to claim 1, wherein
   the controller generates the pathway by use of the first position and a second position of the first object.

3. The robot according to claim 2, wherein
   the controller further generates the pathway by use of a first orientation corresponding to the first position and a second orientation corresponding to the second position.

4. The robot according to claim 1, wherein
   according to the relative position, the relative orientation, and the first position, the controller determines a moving speed of the arm.

5. The robot according to claim 4, wherein
   the controller determines the moving speed of the arm by use of the first object movable range.

6. The robot according to claim 5, wherein
   the controller calculates a value which represents a degree of difficulty in moving the first object or a degree of ease in moving the first object depending on the relative position and the relative orientation, and the controller determines the moving speed of the arm by use of the value.

7. The robot according to claim 5, wherein
   the controller determines the moving speed of the arm by use of a third position of the first object and a fourth position of the first object.

8. The robot according to claim 7, wherein
   the controller further determines the moving speed of the arm by use of a third orientation corresponding to the third position and a fourth orientation corresponding to the fourth position.

9. A control unit generating a pathway according to a relative position and a relative orientation between a first object and a second object, and according to a first position of the first object,
   wherein the first object is moved together with an arm provided to a robot,
   wherein the control unit generates the pathway by use of a first object movable range according to the relative position and the relative orientation, and
   wherein according to the first object movable range, the control unit calculates a value which represents a degree of difficulty in movement of the first object or a degree of ease in movement of the first object depending on the relative position and the relative orientation, and the control unit generates the pathway by use of the value which represents the degree.

10. A control method comprising:
    generating a pathway according to:
       a relative position and a relative orientation between a first object and a second object; and
       a first position of the first object, the first object being moved together with an arm provided by a robot;
    generating the pathway by use of a first object movable range according to the relative position and the relative orientation, and
    according to the first object movable range, calculating a value which represents a degree of difficulty in movement of the first object or a degree of ease in movement of the first object depending on the relative position and the relative orientation, and generating the pathway by use of the value which represents the degree.

* * * * *